US008608319B2

(12) United States Patent
Griswold et al.

(10) Patent No.: US 8,608,319 B2
(45) Date of Patent: *Dec. 17, 2013

(54) MULTI-LAYER PROJECTION DISPLAYS

(75) Inventors: Chauncey W. Griswold, Reno, NV (US); Robert Maddox, Sparks, NV (US)

(73) Assignee: IGT, Reno, NV (US)

( * ) Notice: Subject to any disclaimer, the term of this patent is extended or adjusted under 35 U.S.C. 154(b) by 262 days.

This patent is subject to a terminal disclaimer.

(21) Appl. No.: 13/089,953

(22) Filed: Apr. 19, 2011

(65) Prior Publication Data
US 2012/0270649 A1  Oct. 25, 2012

(51) Int. Cl.
*G03B 21/26* (2006.01)
(52) U.S. Cl.
USPC ........... 353/94; 353/74; 353/79; 353/119; 353/121; 353/122; 345/1.3; 349/33; 349/41
(58) Field of Classification Search
USPC ............ 353/74, 79, 119, 122, 94, 99, 121; 349/5, 7–9, 15, 54, 144, 42, 50, 33, 41; 348/449, 462, 463, 466, 744–747; 359/449, 462, 463, 466; 345/1.3, 3.1
See application file for complete search history.

(56) References Cited

U.S. PATENT DOCUMENTS

| 4,670,744 | A  |   | 6/1987  | Buzak |         |
|-----------|----|---|---------|-------|---------|
| 4,952,031 | A  | * | 8/1990  | Tsunoda et al. | 349/24 |
| 5,024,521 | A  |   | 6/1991  | Zuchowski et al. |    |
| 5,745,197 | A  |   | 4/1998  | Leung et al. |     |
| 5,764,317 | A  |   | 6/1998  | Sadovnik et al. |   |
| 6,310,675 | B1 | * | 10/2001 | Yaniv | 349/141 |
| 7,800,703 | B2 | * | 9/2010  | Zuidema et al. | 349/15 |
| 8,059,216 | B2 | * | 11/2011 | Hiddink et al. | 349/15 |
| 2001/0013971 | A1 | * | 8/2001 | Kleinberger et al. | 359/465 |
| 2002/0163482 | A1 |   | 11/2002 | Sullivan |  |
| 2005/0110964 | A1 | * | 5/2005 | Bell et al. | 353/122 |
| 2010/0195202 | A1 | * | 8/2010 | Masalkar | 359/460 |

FOREIGN PATENT DOCUMENTS

| JP | 60-165632 | 8/1985 |
| JP | 2002-228975 | 8/2002 |
| WO | WO91/15930 | 10/1991 |

OTHER PUBLICATIONS

AU Examination Report dated Nov. 29, 2012 issued in Application No. 201202263.
Korean office action for KR Application No. 10-2012-0041097, mail date Apr. 24, 2013, 7 pages (translation included).
Search report for EP Application No. 12 16 4224, mail date Aug. 8, 2013, 6 pages.

* cited by examiner

*Primary Examiner* — Georgia Y Epps
*Assistant Examiner* — Sultan Chowdhury
(74) *Attorney, Agent, or Firm* — Foley & Lardner LLP

(57) ABSTRACT

A multi-layer projection display including first and second panels separated by a predetermined distance, wherein at least a portion of the first panel overlaps at least a portion of the second panel, and the first panel is disposed between a viewing location and the second panel. The display also includes a controller configured to cause the first and second panels to alternate between substantially opaque and substantially transparent states at a determined frequency, such that the first panel is substantially opaque when the second panel is substantially transparent, and the second panel is substantially opaque when the first panel is substantially transparent. The display further includes a projector configured to project an image onto the first panel when the first panel is substantially opaque, and further configured to project the image onto the second panel when the second panel is substantially opaque.

53 Claims, 18 Drawing Sheets

← 310

| Panel | Image | Duration |
|-------|-------|----------|
| P1 | I1 | D |
| P2 | I1 | D |
| P3 | I1 | D |

| Panel | Image | Duration |
|-------|-------|----------|
| P1 | I1 | D |
| P2 | I2 | D |
| P3 | I3 | D |

| Panel | Image | Projector # | Duration |
|-------|-------|-------------|----------|
| P1 | I1 | Proj1 | D |
| P2 | I2 | Proj2 | D |
| P3 | I3 | Proj1 | D |
| P4 | I4 | Proj2 | D |

FIG. 3C

MULTI-LAYER PROJECTION DISPLAYS

FIELD OF THE INVENTION

The present invention relates generally to computer display screens, and more particularly to multiple-layer displays for use in electronic wager gaming machines.

BACKGROUND

Modern electronic gaming machines have liquid crystal displays on which game graphics are displayed. The progress and outcomes of games can be displayed on a relatively large LCD display, and other game graphics, such as button labels, game theme illustrations, and the like can be displayed on smaller LCD displays, which can be located, for example, behind clear plastic surfaces. The LCD displays can be multi-layer displays (MLD) that produce an appearance of three-dimensional depth in displayed graphics images by displaying multiple two-dimensional images on corresponding multiple overlapping LCD displays. Such multi-layer displays are available from, for example, PureDepth, Inc. of Redwood City, Calif. The PureDepth MLD's can include two overlapping stacked LCD displays that are separated by a distance and are separately addressable to provide separate or coordinated images between the LCDs. The PureDepth units provide a binocular depth cue and intrinsic motion parallax, where the x and y distance changes between objects displayed on different video planes depending on viewing angle.

SUMMARY

Existing MLD's use two Liquid Crystal Display (LCD) panels backlit by a light source such as fluorescent lamps or Light Emitting Diodes (LED's). The LCD panels are separated by other layers, such as a diffuser, at least one pair of polarizers (horizontal and vertical), and a color filter. These layers absorb approximately 97% of the light produced by the light source, so that approximately 3% of that light reaches the viewer. The light source is therefore operated at high intensity to compensate for the light loss, and existing MLD's consume significant energy and produce significant heat.

In one aspect, the invention features a multi-layer projection display capable of producing images that have a three-dimensional appearance. The multi-layer projection display includes a projector, a controller, and first and second panels separated by a predetermined distance. The panels are at least partially overlapping, and the first panel is located between a viewing location and the second panel. The controller is configured to cause the first and second panels to alternate between opaque and transparent states, such that the first panel is opaque when the second panel is transparent, and the second panel is opaque when the first panel is transparent. The projector is configured to project an image onto the first panel when the first panel is opaque, and to project the image onto the second panel when the second panel is opaque.

The invention relates, in another aspect, to a multi-layer projection display including first and second panels separated by a predetermined distance, wherein at least a portion of the first panel overlaps at least a portion of the second panel, and the first panel is disposed between a viewing location and the second panel. In addition, each panel is configured to become substantially transparent in response to application of a first voltage to the respective panel, and further configured to become substantially opaque in response to application of a second voltage to the respective panel. The display also includes a controller configured to cause the first and second voltages to alternate between the first voltage level and the second voltage level at a determined frequency such that the first panel is substantially opaque when the second panel is substantially transparent, and the second panel is substantially opaque when the first panel is substantially transparent. Further, the display includes a first projector configured to project a first image onto the first panel when the first panel is substantially opaque, a second projector configured to project a second image onto the second panel when the second panel is substantially opaque, wherein the first image is visible and the second image is not is visible at the viewing location when the first image is projected onto the first panel, and wherein the second image is visible and the first image is not visible at the viewing location when the second image is projected onto the second panel.

The invention relates, in another aspect, to a multi-layer projection display including first, second, and third panels, the first and second panels and the second and third panels separated by a predetermined distance, wherein at least a portion of the first panel overlaps at least a portion of the second panel and at least a portion of the third panel, the first panel is disposed between a viewing location and the second panel, and the second panel is disposed between the first panel and the third panel. The display also includes a controller configured to cause the first, second, and third panels to alternate between substantially opaque and substantially transparent states at a determined frequency that defines a plurality of time periods, such that only one of the panels is substantially opaque during a least a portion of each of the plurality of time periods. Further, the display includes a projector configured to project an image onto one of the panels when the one of the panels is substantially opaque. In addition, the image projected onto the one panel is visible, and no image is visible on the other panels, at the viewing location when the image is projected onto the one panel.

The invention relates, in still another aspect, to a gaming machine operable to play a game of chance. The gaming machine includes a value input device capable of receiving value, a player input device operable to place a wager on the game of chance, and a value output device capable of outputting value associated with play of the game of chance. The gaming machine further includes a multi-layer projection display. The display includes first and second panels separated by a predetermined distance, wherein at least a portion of the first panel overlaps at least a portion of the second panel, and the first panel is disposed between a viewing location and the second panel. The display also includes a controller configured to cause the first and second panels to alternate between substantially opaque and substantially transparent states at a determined frequency, such that the first panel is substantially opaque when the second panel is substantially transparent, and the second panel is substantially opaque when the first panel is substantially transparent. The display further includes a projector configured to project an image onto the first panel when the first panel is substantially opaque, and further configured to project the image onto the second panel when the second panel is substantially opaque.

The invention relates, in yet another aspect, to a method for displaying a multi-layer projection image. The method includes providing first and second panels separated by a predetermined distance. At least a portion of the first panel overlaps at least a portion of the second panel and the first panel is disposed between a viewing location and the second panel. The method also includes a controller causing the first and second panels to alternate between substantially opaque and substantially transparent states at a determined frequency, such that the first panel is substantially opaque when the second panel is substantially transparent, and the second panel is substantially opaque when the first panel is substantially transparent. The method further includes a projector projecting an image onto the first panel when the first panel is substantially opaque and a projector projecting the image onto the second panel when the second panel is substantially opaque.

Embodiments of the invention may include, for example, more than two panels, multiple projectors, different locations for projectors, and/or multiple images, wherein each image is associated with a panel.

Various other implementations can include one or more of the following features. The image projected onto the first panel is visible at the viewing location when the image is projected onto the first panel, and the image projected onto the second panel is visible at the viewing location when the image is projected onto the second panel. No image is visible on the second panel when the image is projected onto the first panel, and no image is visible on the first panel when the image is projected onto the second panel. The first panel is positioned such that a line of sight passes from the viewing location through the first panel to the projector. The second panel is disposed between the first panel and the projector. The first and second panels are positioned such that a line of sight passes from the viewing location through the first and second panels to the projector. The projector is configured to project the image onto the first panel through the second panel when the second panel is substantially transparent, and the image projected onto the second panel is visible at the viewing location through the first panel when the first panel is substantially transparent. The first and second panels are positioned such that a line of sight passes from the viewing location through the first and second panels to the projector. The determined frequency is sufficient to cause the images projected onto the first and second panels to appear to a human user as a single image that includes both of the projected images. The determined frequency is at least 60 transitions between the opaque and transparent states per second. The controller is operable to cause the first or second panel to become substantially opaque by applying a first voltage to the first or second panel, respectively, and further operable to cause the first or second panel to become substantially transparent by applying a second voltage to the first panel or second panel, respectively. The projector is configured to project a second image onto the second panel when the second panel is substantially opaque. A second projector configured to project a second image onto the second panel when the second panel is substantially opaque. The first projector is configured to project a blank image onto the second panel when the second panel is substantially opaque.

The invention can include or more of the following advantages. One aspect of the invention includes multiple overlapping panels. Since the panels are overlapping and separated by a distance, and alternate between opaque and transparent states at a high frequency, e.g., 60 Hz, parallax is created and the images on both panels appear to the eye to both be visible simultaneously, even though they are actually alternating between the nearer and farther panels.

These and other features and advantages of the present invention will be presented in more detail in the following specification of the invention and the accompanying figures, which illustrate, by way of example, the principles of the invention.

BRIEF DESCRIPTION OF THE DRAWINGS

FIGS. 3A-3C illustrate controller configurations in accordance with embodiments of the invention.

DETAILED DESCRIPTION

While the present invention will be described with reference to a few specific embodiments, the description is illustrative of the invention and is not to be construed as limiting the invention. Various modifications to the present invention can be made to the preferred embodiments without departing from the true spirit and scope of the invention as defined by the appended claims. For example, the steps of methods shown and described herein are not necessarily performed in the order indicated. It should also be understood that the methods of the invention may include more or fewer steps than are indicated.

Device functionality may be apportioned by grouping or dividing tasks in any convenient fashion. Therefore, when steps are described herein as being performed by a single device (e.g., a single printer, gaming machine, handheld device or server), the steps may alternatively be performed by multiple devices and vice versa.

Figure 1A:
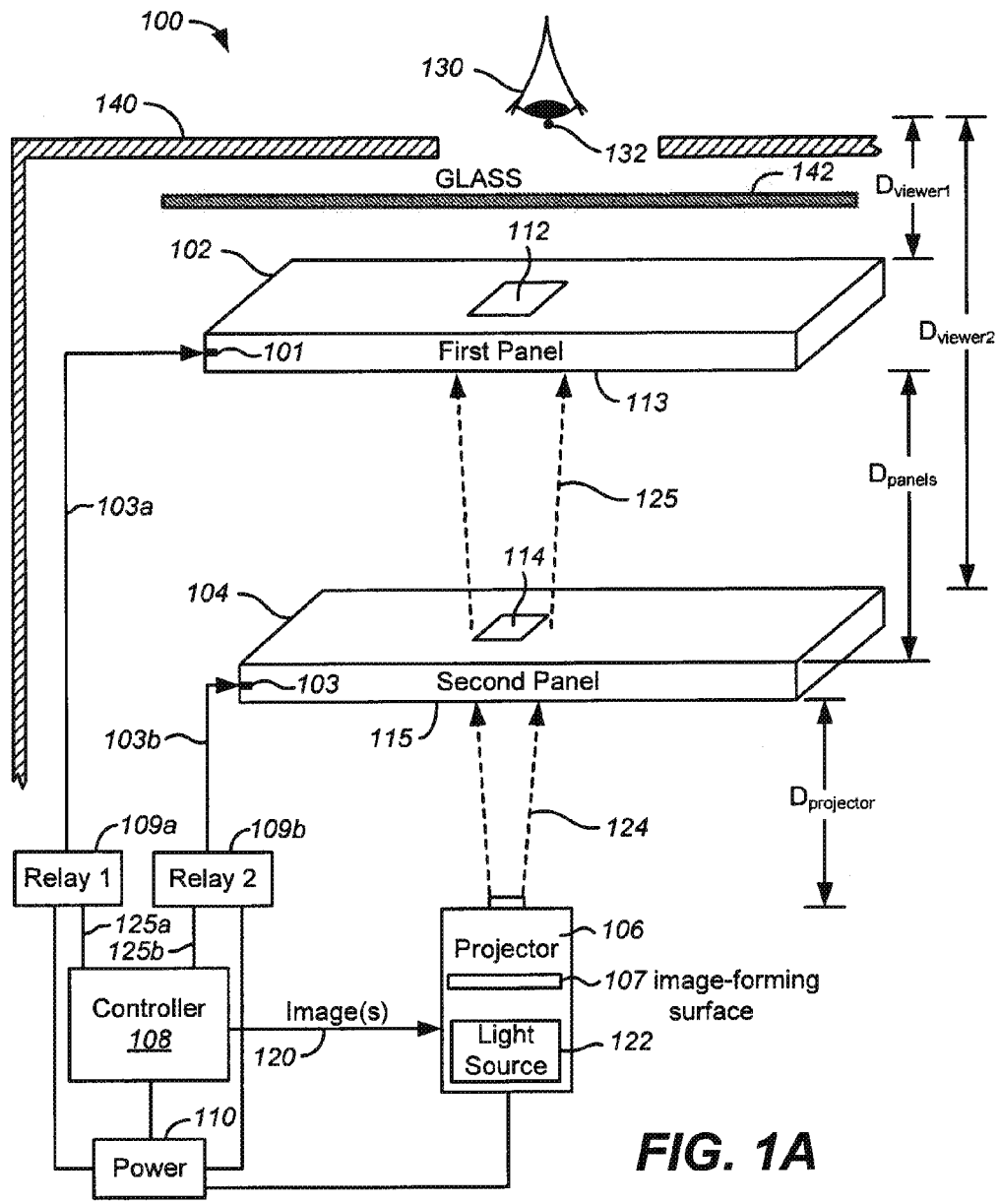
FIG. 1A illustrates a two-layer projection display in accordance with embodiments of the invention.

FIG. 1A illustrates a two-layer projection display 100 in accordance with embodiments of the invention. Two panels 102, 104 corresponding to the two layers are at least partially overlapping, so that a line of sight passes from a viewing point 132 through both panels 102, 104 to a projector 106. The projector 106 that projects images 120, e.g., graphics images in bitmap form, which are received from a controller 108 onto a first panel 102 to form, in rapid succession, a first projected image 112 on the first panel 102 and a second projected image 114 on the second panel 104. The images 112, 114 appear at alternating times because the panels 102, 104 alternate between transparent and translucent (i.e., opaque) states so that the first panel 102 is transparent and the second panel 104 is opaque for at least a short period of time before the panels transition to the complementary state, in which the first panel 102 is opaque and the second panel 104 is transparent for at least a short period of time. The panels then transition back to the first state, in which the first panel is transparent and the second panel 104 is opaque, and the cycle repeats, so that only one of the panels 102, 104 is opaque for at least a short period of time before the transition to the next state occurs. This two-state cycle repeats as long as the display 100 is in an operational mode. Each of the panels 102, 104 transitions between the transparent and opaque states, and vice versa, in response to changes in voltage levels applied to electrical terminals 101, 103 of the respective panels by the controller 108 via relays 109a, 109b.

As a result of this alternation between transparent and opaque states, the projected image 112 appears on the first panel 102 and is visible at the viewing point 132 when the first panel is in an opaque state, and the projected image 114 appears on the second panel 104 when the second panel is in an opaque state. The panels 102, 104 alternate between transparent and opaque states at a frequency that is sufficiently high to cause the alternating images 112, 114 to appear (at least to a human viewer) to blend into a single image having a three-dimensional appearance when the viewer's eye 130 is located at or near the viewing point 132. The three-dimensional appearance results from the difference in distance from the eye 130 of the first panel 102 and the second panel 104. This distance, labeled $D_{panels}$, e.g., 1", 2", or a value of similar magnitude, can create a parallax effect, so that, for example, as the viewer's eye 130 moves parallel to the panels 102, 104, the image 114 on the farther panel 104 appears to move by slightly greater distances than the image on the near panel 102, thereby creating a three-dimensional appearance. In one example, the images 112, 114 are both the same image, and the three-dimension effect is produced primarily by the distance between the panels 102, 104. In other example, the projector 106 can project multiple images, e.g., a different image for each panel, so that the image 112 is different from the image 114. The parallax effect is described in more detail in the context of a multilayer display (MLD), in which multiple liquid crystal displays produce parallax, in, for example, U.S. Patent Application Publication No. 2008/0113745A1 titled "Separable Game Graphics On a Gaming Machine" having Ser. No. 11/858,693, which is incorporated herein by reference in its entirety and for all purposes.

The display 100 is enclosed in or covered by a casing 140 and separated from the external environment by a transparent barrier 142, such as a sheet of glass or plastic. Example applications of the display 100 include displaying images for reconfigurable buttons, as well as other images, on electronic gaming machines. In electronic gaming machine applications, the images 112, 114 may include text and graphics for the buttons, game art to be displayed on the gaming machine cabinet, and the like. The casing 140 may be, for example, part of a cabinet of an electronic gaming machine, or a button of an electronic game machine, or the enclosure of any other device in which the display 100 is used.

Other variations are contemplated, such as positioning additional projectors between the panels 102, 104 or between the viewer 130 and the first panel 102, projecting a different image from each of the projectors, non-parallel panels, three or more panels, a touch screen and/or a haptic feedback device on the glass 142. Some such variations are described in more detail below.

The panels 102, 104 are made from material that varies in transparency in response to changes in electric current, such as, for example, polymer-dispersed liquid crystal (PDLC), which is available from Sager Glass Technology Co. of Beijing, China. The PDLC contains droplets of liquid crystal uniformly dispersed in a flexible plastic film. When no power is supplied to the film, the crystals scatter randomly and diffuse incoming light in many different directions, and the light is not visible through the film. When power is applied to the film, the crystals become aligned and the film becomes transparent. Cholesteric liquid crystals can be used, in which case the film can also polarize the incoming light. Suspended particle devices (SPD), electrochromic devices, and the like can be used as alternatives to PDLC material. SPD's and PDLC devices become transparent when a first voltage is applied, and become opaque or translucent when a second voltage is applied, with the second voltage being low or approximately zero. In contrast, electrochromic devices become opaque when applied with a voltage, and transparent when little or no voltage is applied. The panels 102, 104 may attain varying levels of translucency and opaqueness. For example, while a PDLC device is ordinarily either transparent or opaque, SPD's and electrochromic devices can have varying degrees of transparency, opaqueness, or translucency, depending on the applied voltage level.

In one example, the projector 106 uses a light source 122 to project the image(s) 120 toward the first and second panels 102, 104. The projector 106 receives the image from the controller 108 as digital data, such as a bitmap or JPEG format data. The projector 106 may be for example a pico projector available from 3M of St. Paul, Minn. The projector 106 is positioned at a distance $D_{projector}$, e.g., 1", 2", or a distance of a similar magnitude, from the second panel 104 and is oriented perpendicularly to the second panel 104, so that the direction of a light beam 124 projecting the image 120 is substantially perpendicular to the second panel 104. In other examples, the light beam 124 need not be substantially perpendicular to the second panel 104, but is at least projected toward the second panel 104. Thus, the projected image 120 appears on the first panel 102 if the first panel is substantially opaque, e.g., 99% of incident light is reflected back by the first panel, and the second panel is substantially transparent e.g., 99% of incident light passes through the second panel. Thus, in the illustrated configuration of the panels at a particular time $t_1$ the projector 106 projects the image 120 through the now transparent second panel 104 onto the first panel 102 to form the first image 112. A viewer 130 looking at the first panel sees the projected first image 112 on the surface of the first panel. At another time, $t_2$, the first panel is substantially transparent, the second panel is substantially opaque, and the projector 106 projects the image 120, since the second panel is substantially opaque the projected image 114 appears on the surface of the second panel, and since the first panel 102 is substantially transparent, the image 114 is visible to the viewer 130 through the now transparent first panel 102. The image 114 is visible to the viewer 130 because although panel 104 is substantially opaque, it is still somewhat translucent such that image 114 projected onto one side of panel 104 is visible to the viewer 130 on the other side of panel 104.

In one embodiment, the controller 108 transmits the signals to the terminals 101, 103 of the respective panels 102, 104 via connections 103a, 103b. The panel 102 becomes substantially transparent in response to a first signal generated by the controller 108, remains substantially transparent while the first signal is being applied, and become substantially opaque in response to a second signal generated by the controller 108 or absence of the first signal. In another example, the panel 102 is substantially opaque when no signal is being received at the terminal 101, and becomes substantially transparent when, or while, a signal is received at the terminal 101. Alternatively, the panel 102 may respond in the opposite manner, e.g., is substantially transparent when no signal is present, and is substantially opaque when a signal is applied.

In one example, the controller 108 applies electrical signals to the panels 102, 104 via wires 103a, 103b. The panels 102, 104 switch states in response to the voltage becoming greater than or less than particular thresholds. The threshold values are dependent upon the type of panels. For illustrative purposes, the panels 102 and 104 have a threshold voltage of 32V, and a working voltage of 75V, which means that the panels 102, 104 become transparent when the voltage at the terminals 101, 103 is 32V or more, and become opaque when the voltage is less than 32V. The working voltage of 75V should be applied at the terminal 101 (or 103) for as long as the panel is to remain transparent. No voltage is necessary when the panel is to remain opaque. There is ordinarily a time delay between the time that the voltage needed to switch to a desired state is applied to a terminal 101, 103 and the time that the panel 102, 104 reaches the desired state. This time delay is based upon the response time of the liquid crystal material in the panel and is referred to herein as a transition delay. The transition delay for switching from the opaque state to the transparent state can be different from the transition delay for switching in the opposite direction (i.e., transparent to opaque). The opaque to transparent transition delay is referred to herein as $t_d$, and the transparent to opaque transition delay is referred to herein as $t_r$. Example values for a PDLC panel are $t_d$=10 milliseconds and $t_r$=2 milliseconds. Other types of panels may have larger or smaller transition delays. These transition delays can be taken into account by the controller 108 as part of a calculation that determines when to apply voltage to the panels to achieve a desired switching frequency or period, as described in more detail below.

In one embodiment, the controller 108 applies voltage to the first panel's terminal 101 by establishing a connection, via the relay 109a, between a power source 110 and the wire 103a that leads to the first panel's terminal 101. Similarly, the controller 108 applies the threshold voltage to the second panel's terminal 103 by establishing a connection via the relay 109b between the power source 110 and the wire 103b that leads to the second panel's terminal 103. The controller 108 establishes or breaks these connections at times appropriate to cause the panels 102, 104 to become transparent or opaque in accordance with the desired switching frequency.

Figure 1B:
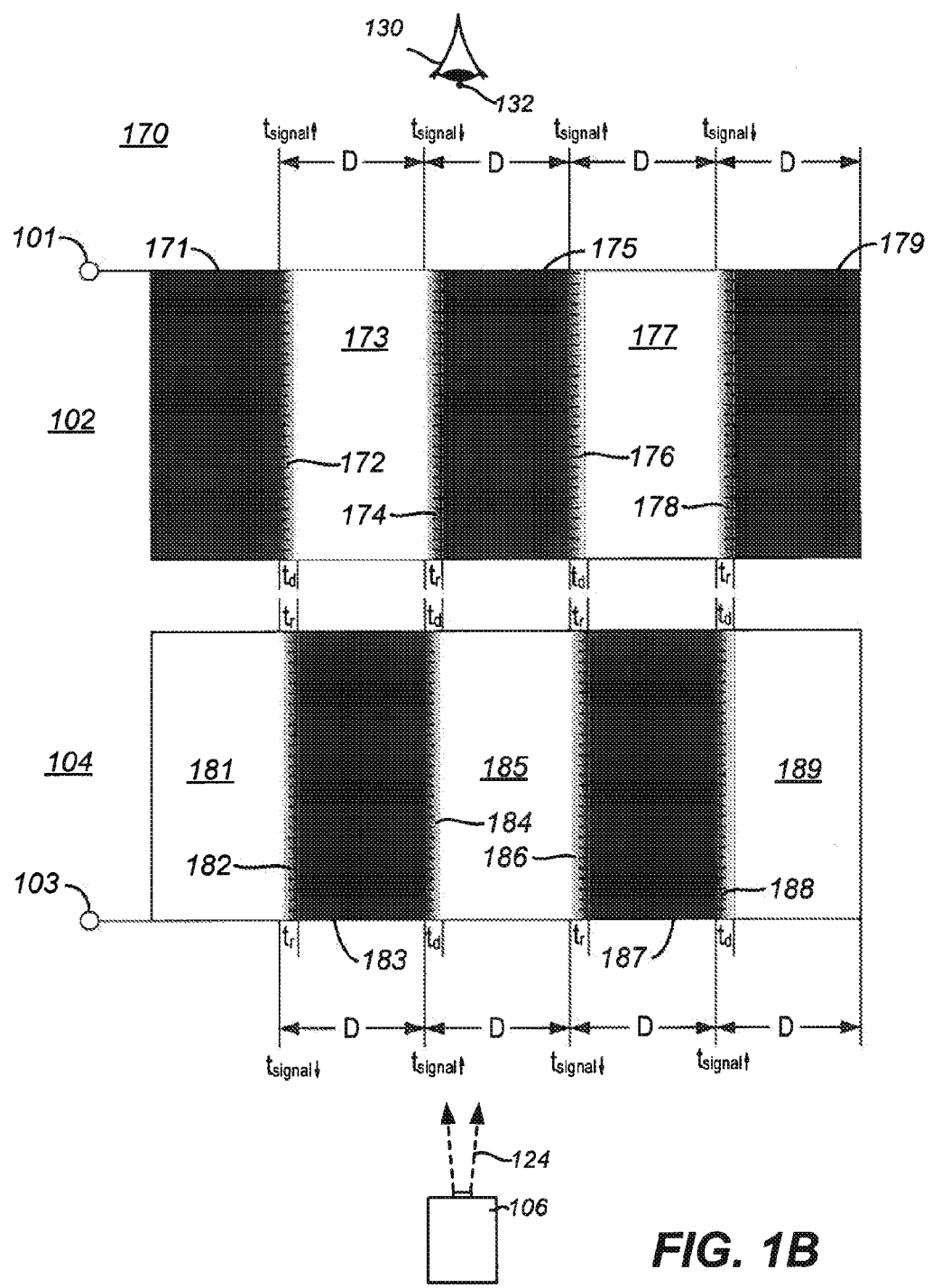
FIGS. 1B and 1C are timing diagrams illustrating transitions between opaque and transparent states in accordance with embodiments of the invention.
Figure 1C:
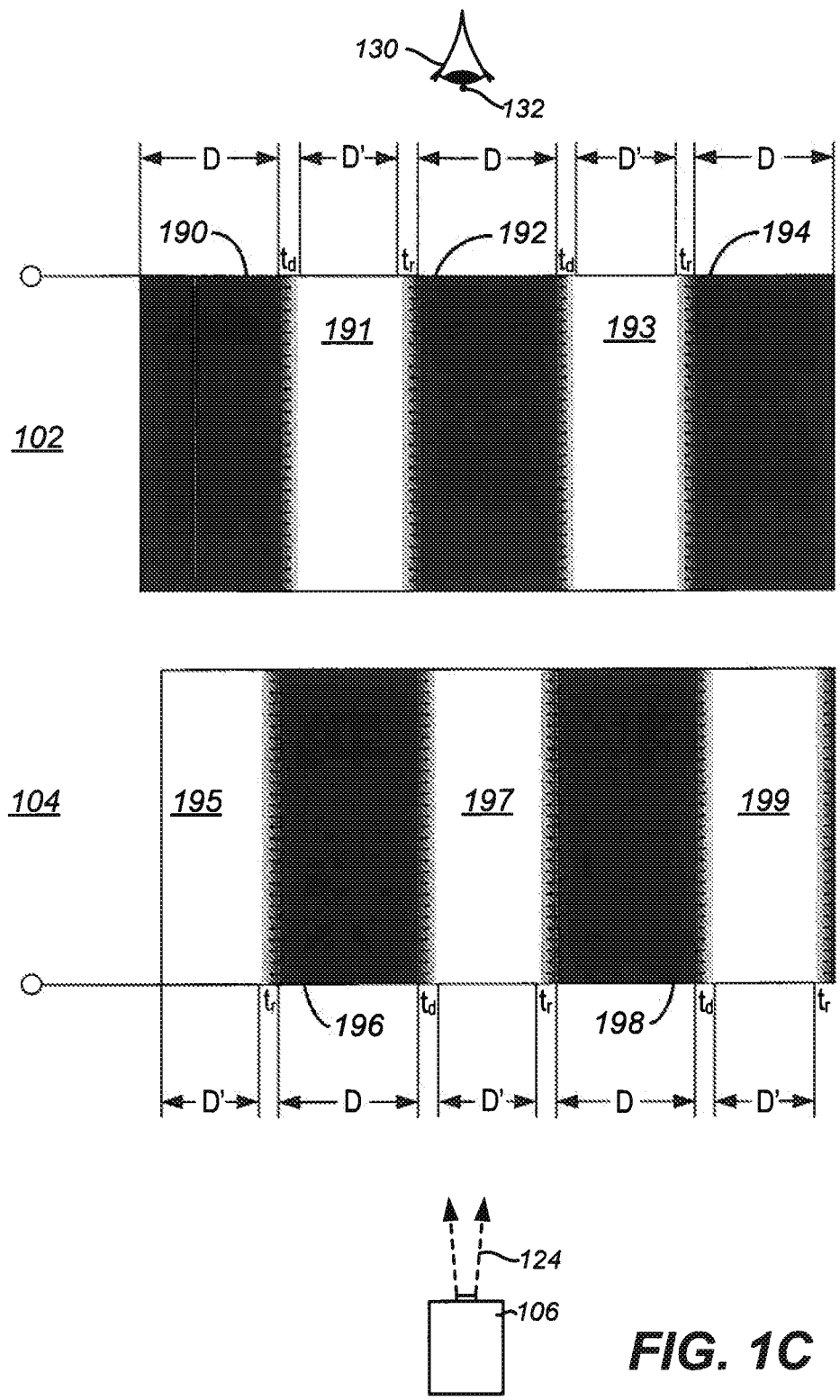

FIGS. 1B and 1C are timing diagrams illustrating transitions between opaque and transparent states in accordance with embodiments of the invention. FIG. 1B illustrates the cycling of the opaque state between two panels 102, 104 with a period of D milliseconds plus a transition time $t_d$ or $t_r$, where the transition time depends upon the direction of the transition. The passage of time is represented by the horizontal axis, with time increasing from left to right. Opaque states are shown as black rectangles, e.g., rectangle 171, and transparent states are shown as white rectangles, e.g., rectangle 173. The black and white rectangles can also represent substantially opaque and substantially transparent states, respectively, since some types of panels 102, 104 do not necessarily reach 100% opacity (i.e., a completely opaque state) or 100% transparency (i.e., a completely clear state).

The timing diagrams in FIGS. 1B and 1C illustrate which panel is visible from a viewing location 132 as time passes. The vertical axis corresponds to a line of sight through a cross-section of the panels 102, 104. At a particular time, the projected image appears on the black panel, and an open (i.e., clear) line of sight passes through the white panel to either the viewing location above the panel 102 or a projector below the panel 104. The opaque (i.e., black) states have images projected thereon by the projector 106. The images projected onto the opaque states are visible if there is a clear vertical line of sight from above the top panel 102 to the opaque state. Transitional states 172, 174 occur in response to voltage changes as described above with respect to FIG. 1A. Opaque-to-transparent transitions 172 are shown as a set of horizontal lines adjacent to the opaque state 171, and occur at times labeled $t_{signalUp}$, which corresponds to a transparent switching voltage, i.e., a voltage reaching or exceeding a threshold for switching to the transparent state. Transparent-to-opaque transitions 174 are shown as a set of horizontal lines adjacent to the opaque state on the right side of the transition, and occur at times labeled $t_{signalDown}$, which corresponds to an opaque switching voltage, i.e., a voltage reaching or falling below the threshold for switching to the opaque state.

The controller 108 causes these voltage changes, thereby implementing the timing pattern shown in FIG. 1B. The controller 108 changes the voltage applied to the panels at times appropriate to produce a new state approximately every D (Duration) milliseconds in both panels. In one example, the controller changes the applied voltage is at a desired frequency, e.g., 60 Hz, i.e., with a period of 16.7 ms (D=16.7 ms). However, as described above, panels can have transition delays $t_d$ and $t_r$, between application of the voltage needed to change states and actually becoming substantially transparent or opaque. If $t_d$ and $t_r$ are substantially the same, applying a switching voltage every D milliseconds will result in a transition delay between each opaque and transparent state of $t_d$=$t_r$ milliseconds. A panel will thus become substantially transparent or substantially opaque every D milliseconds, as shown in FIG. 1B. In other embodiments, the opaque-to-transparent transitions 172 can be either faster or slower than the transparent-to-opaque transitions 174, as is the case for at least some PDLC panels. In this case, switching voltages can be applied every D milliseconds, and there will be a transition delay ($t_d$ or $t_r$) before the panel becomes substantially opaque or transparent. This cycle repeats as long as the MLPD is in operation.

The transitional states 172, 174, 176, 178 of the top panel 102 are partially opaque and may partially block the view of the bottom panel 104, so that the bottom panel 104 may be partially visible at the viewing location 132. In the timing pattern of FIG. 1B, the bottom panel is in one of the transitional states 182, 184, 186, 188 at substantially the same times that the top panel 102 is in one of its transitional states, as can be seen by the vertical alignment of the top and bottom transitional states 172 and 182, and so on. In one example, as described above, the opaque-to-clear transition takes more time than the clear-to-opaque transition, in which case the transition delay $t_d$ is greater than $t_r$, and the $t_d$ transitions should be in FIG. 1B wider than the $t_r$ transitions to illustrate the longer duration of the $t_d$ transitions. In this example, if the specified period D is 20 milliseconds, $t_d$ is 10 milliseconds, and $t_r$ is 2 milliseconds, each panel is substantially opaque for D−$t_r$=18 milliseconds, and each panel is substantially transparent for D−$t_d$=10 milliseconds.

In embodiments such as that shown in FIG. 1B, in which the transition states overlap, the transition times should be sufficiently small so that a human viewer is unlikely to perceive the transition states of the bottom panel 104. However, a flickering effect may be visible at the viewing location 132 as a result of the transition states 182 and 184 of the bottom panel 104 being partially clear and therefore not forming images. These partially clear transition states 182 and 184 of the bottom panel can potentially be at least partially visible through the transition states 172 and 174 of the top panel 102, which occur at the same times as the transition states 182 and 184 of the bottom panel in FIG. 1B. If the transition states 182 and 184 are partially clear, a projected image may not form on the panel during those states, and the panel may pass the projector's light through the partially clear transition states 172 and 174, resulting in flickering, or less distinct images, or some other such effect. In one example, a PDLC panel may become transparent or opaque gradually, so that the panel is transparent for a portion of the transition time. In other examples, the panel may switch from opaque to transparent or vice versa immediately after the entire transition period has elapsed.

FIG. 1C illustrates cycling between the opaque and transparent states with transitional delays $t_d$ and $t_r$, but with the opaque states maintained for D milliseconds and the transparent states maintained for D−$t_d$−$t_r$ (i.e. D') milliseconds. The opaque states are longer than the transparent states so that transition states of the bottom panel 104 are not visible at the viewing location 132. Since there are no partially clear lines of sight from the viewing location 132 to the projector 106 in the example of FIG. 1C, the transition states of the bottom panel 104 are not visible at the viewing location 132, and flickering does not occur. Conversely, in another example, the transparent state can be maintained for D milliseconds and the opaque state can be shortened, with the transition delays $t_d$ and $t_r$ occurring on one panel while the other panel is transparent. In another embodiment, each opaque and transparent state lasts for a period of D milliseconds on both panels.

Figure 2:
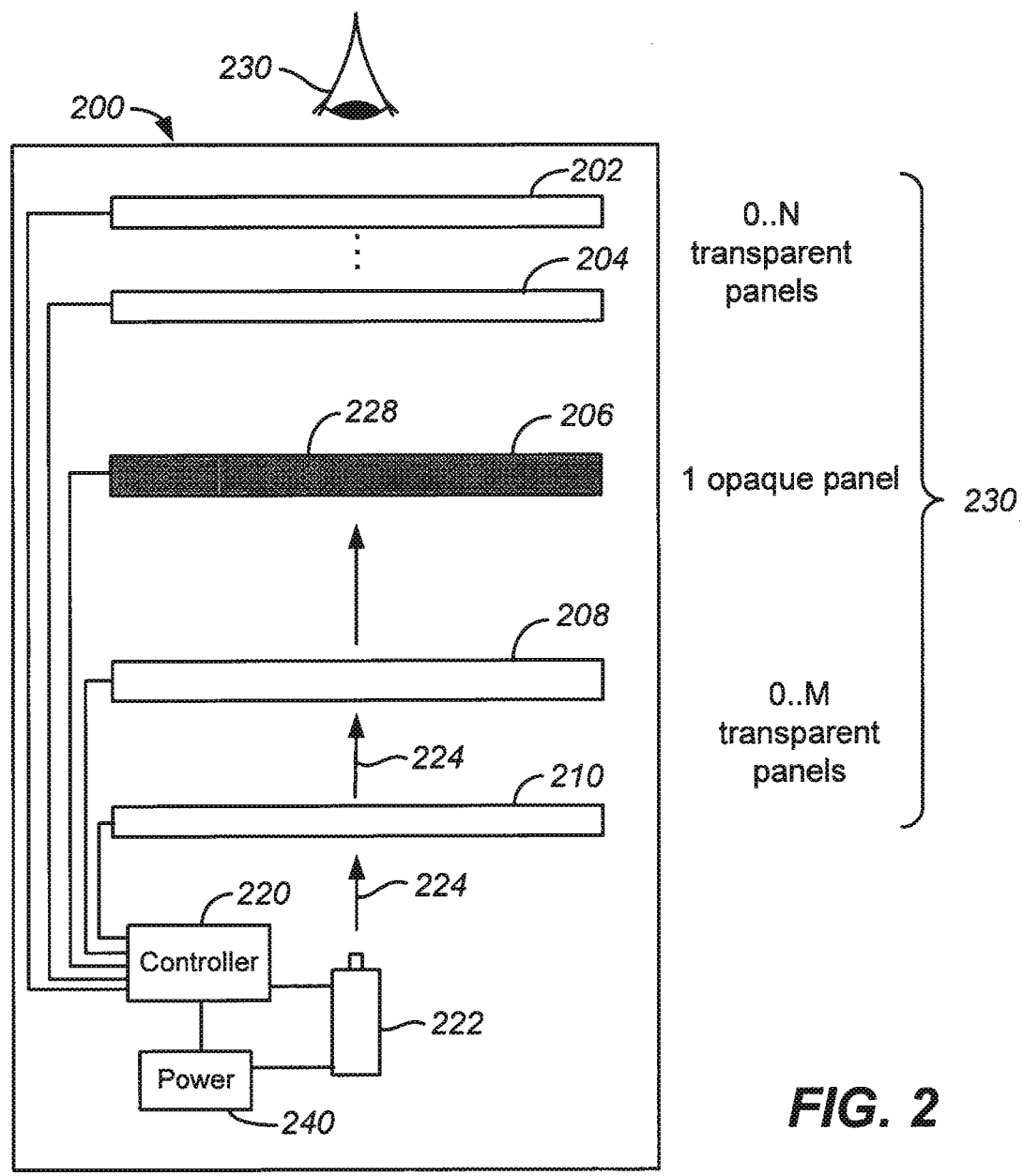
FIG. 2 illustrates a multi-layer projection display in accordance with embodiments of the invention.

FIG. 2 illustrates a multi-layer projection display 200 in accordance with embodiments of the invention. As shown in FIG. 2, an embodiment can have any number of panels, with one panel being opaque while the rest of the panels are transparent. In FIG. 2, 0 to N transparent panels are in between a viewer 230 and opaque panel 206. In addition, 0 to M transparent panels are in between projector 222 and opaque panel 206 such that projected beam 224 passes through transparent panels 210 and 208 to form an image 228 onto opaque panel 206, viewable by viewer 230. Display 200 also includes controller 220 and power source 240.

FIGS. 3A-3C illustrate controller configurations in tables 310, 320, and 330 in accordance with embodiments of the invention. FIG. 3A shows that for three panels, a single image can be displayed on each panel at different times, and with a duration of D time units between cycling of the panel states. FIG. 3B shows that for three panels, three different images can be displayed, one on each panel, and with a duration of D time units between cycling of the panel states. FIG. 3C shows that for four panels, four different images can be displayed, one on each panel, and with a duration of D time units between cycling of the panel states, and with the first and third images projected onto the first and third panels by a first projector, and the second and fourth images projected onto the second and fourth panels by a second projector.

Figure 4:
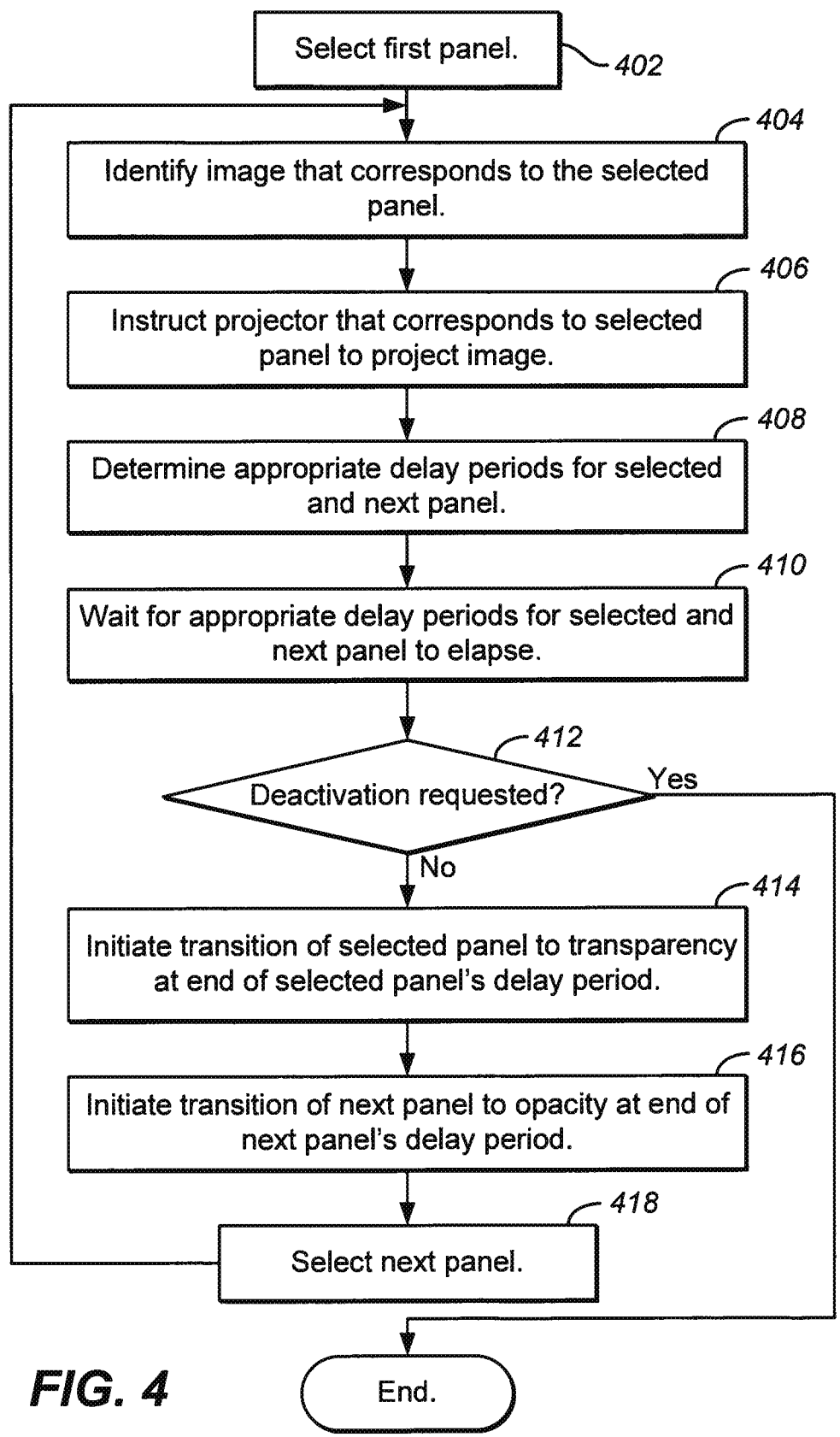
FIG. 4 is a flowchart illustrating a process of controlling projectors and panels in a multi-layer projection display in accordance with embodiments of the invention.

FIG. 4 is a flowchart illustrating a process of controlling projectors and panels in a multi-layer projection display in accordance with embodiments of the invention. The panels, projectors, and display periods can be determined by consulting a configuration table such as those shown in FIGS. 3A-3C. A first panel is selected at block 402. Next, an image that corresponds to the selected panel is identified at block 404. A projector that corresponds to the selected panel is instructed to project the image (onto the panel) at block 406. Appropriate delay periods for the selected and next panels are determined at block 408. Block 410 waits for the appropriate display periods for the selected and next panels to elapse. Block 412 determines if the projection display system has been deactivated, or a deactivation request has been received. If deactivation is not occurring, block 414 initiates transition of the selected panel to a transparent state at the end of the selected panel's display period, block 416 initiates transition of the next panel to an opaque state at the end of the next panel's display period, and block 418 selects the next panel.

Figure 5A:
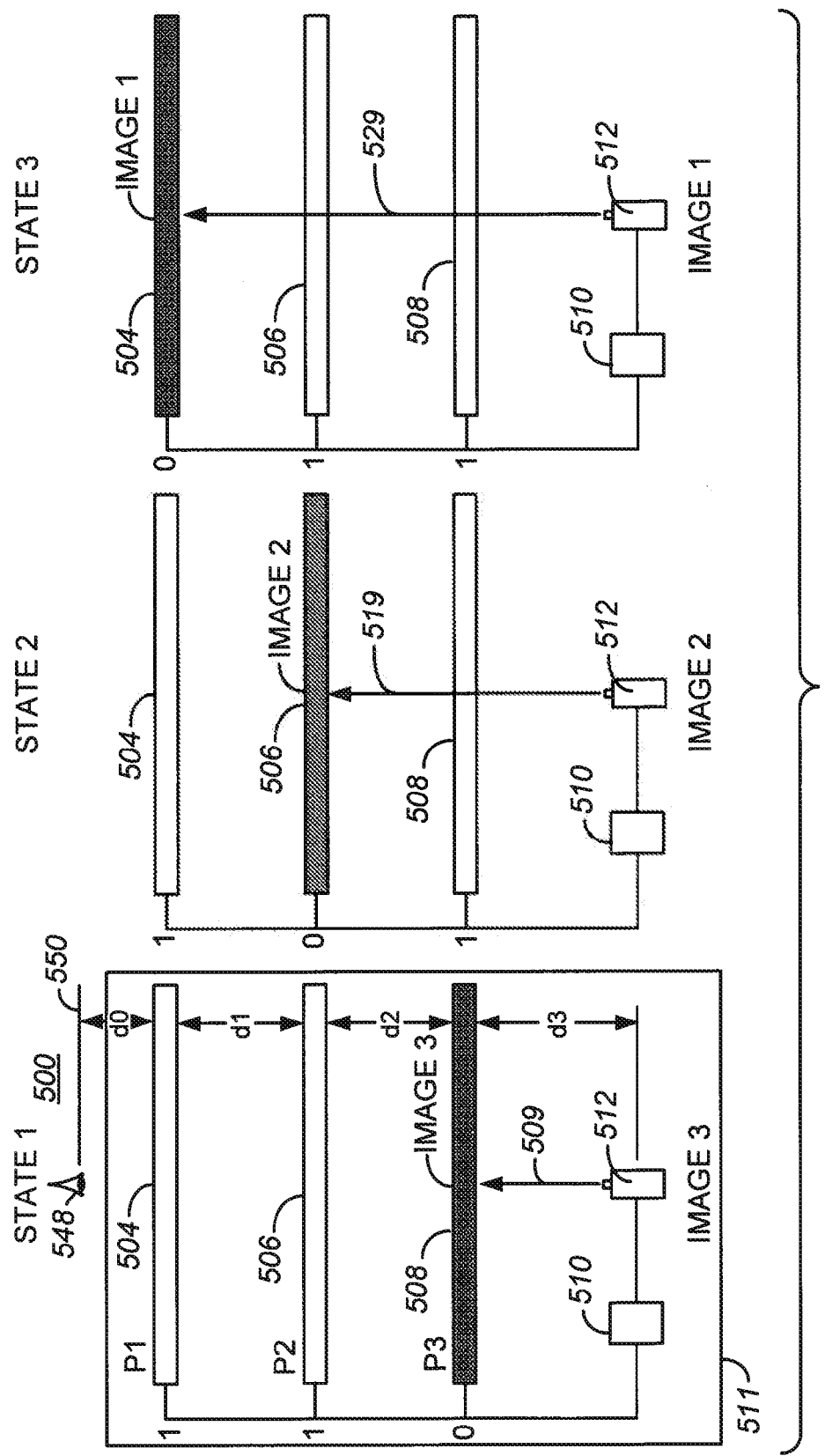
FIG. 5A illustrates a three-layer projection display in accordance with embodiments of the invention.

FIG. 5A illustrates a three-layer projection display 500 in accordance with embodiments of the invention. The display 500 includes three states, STATE1, STATE2, and STATE3, each state including three panels 504, 506, 508 which are at least partially overlapping so that a line of sight passes from a viewer 548 at viewing point 550 through the panels to a projector 512 which is under control of a controller 510. The display 500 is also enclosed in or covered by a casing 511. Distance d0 represents the distance between viewing point 550 and first panel 504. Distance d1 represents the distance between first panel 504 and second panel 506. Distance d2 represents the distance between second panel 506 and third panel 508.

Projector 512 is a distance d3 away from third panel 508 and is oriented perpendicularly to third panel 508 so that the direction of light beam 509 projecting the image IMAGE3, received from controller 510, is substantially perpendicular to the third panel 508. Projector 512 projects light beams 509, 519, and 529 in rapid succession, forming a first projected image IMAGE3 on panel 508, a second projected image IMAGE2 on panel 506, and a third projected image IMAGE1 on panel 504. The images IMAGE3, IMAGE2, and IMAGE1 appear at alternating sequential times because the panels 508, 506, and 504 alternate sequentially between transparent and opaque states forming system states STATE1, STATE2, and STATE3. Each system state occurs for at least a short period of time before the panels transition into the next sequential state. For example, at any given moment, the system will be in STATE1, where the image IMAGE3 is projected via light beam 509 onto the third panel 508. Then in the same example, after at least a short period of time, the system transitions into STATE2, where the image IMAGE2 is projected via light beam 519 onto second panel 506. Then still in the same example, after at least another short period of time, the system transitions to STATE3, where the image IMAGE1 is projected via light beam 529 onto the first panel 504. Each of the panels 504, 506, and 508 transitions between transparent and opaque states, and vice versa, in response to changes in voltage levels applied to their respective electrical terminals by controller 510. It should be noted that the sequence with which this example suggests is not the only sequence possible. The order in which the system cycles through different states can be ordered in whichever way convenient for other embodiments of the invention.

In one embodiment, system state STATE1 is configured such that panels 504 and 506 are transparent, while panel 508 is opaque. This allows for the viewer 548 at viewing point 550 to see through the transparent panels 504 and 506 to view the image IMAGE3 projected onto panel 508. After at least a short period of time, the system transitions, via changing voltages applied to the panels by controller 510, into STATE2.

In one embodiment, system state STATE2 is configured such that panels 504 and 508 are transparent, while panel 506 is opaque. This allows for the viewer 548 at viewing point 550 to see through the transparent panel 504 to view image IMAGE2 projected onto panel 506. Image IMAGE2 is projected onto panel 506 via light beam 519 projected by projector 512 through transparent panel 508. After at least a short period of time, the system transitions, via changing voltages applied to the panels by controller 510, into STATE3.

In one embodiment, system state STATE3 is configured such that panels 506 and 508 are transparent, while panel 504 is opaque. This allows for the viewer 548 at viewing point 550 to view image IMAGE1 projected onto panel 504. Image IMAGE1 is projected onto panel 504 via light beam 529 projected by projector 512 through transparent panels 508 and 506. After at least a short period of time, the system transitions, via changing voltages applied to the panels by controller 510, into STATE1.

Figure 5B:
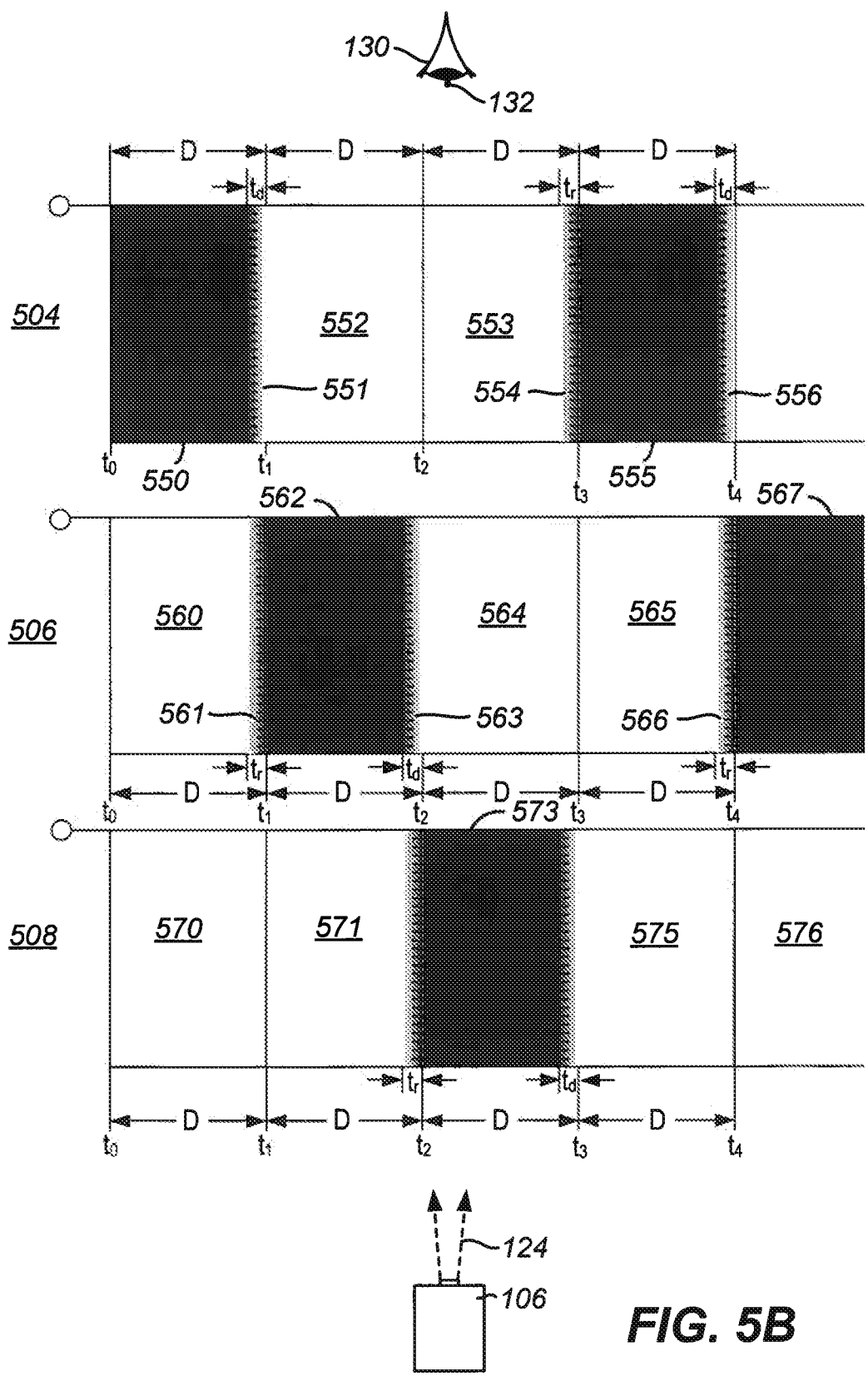
FIG. 5B is a timing diagram illustrating transitions between opaque and transparent states in a three-layer projection display in accordance with embodiments of the invention.

FIG. 5B is a timing diagram illustrating transitions between opaque and transparent states in a three-layer projection display in accordance with embodiments of the invention. The passage of time is represented by the horizontal axis, with time increasing from left to right. As with FIG. 1B, opaque states are shown as black rectangles, e.g. rectangle 550, and transparent states are shown as white rectangles, e.g. rectangle 552. The first panel 504 is initially opaque (at time $t_0$), while the second panel 506 and third panel 508 are initially transparent, to satisfy the condition that only one of the panels should be opaque for at least some time between each pair of transitions. Thus, the first panel remains opaque for a period of time, while the second and third panels remain transparent. The controller causes the panel to alternate between opacity and transparency according to a time period D, where a panel reaches full transparency D milliseconds after reaching full opacity. In FIG. 5B, the duration D includes the transition times, so that an opaque panel remains at full opacity for $D-t_d$ milliseconds, and a transparent panel begins the transition to opacity at $t_r$ time units before full opacity is reached. Other timing rules are also possible with other embodiments of the invention (not shown in figures). In one embodiment, rectangle 550 remains at full opacity for a full D milliseconds and rectangle 552 reaches full transparency $t_d$ milliseconds after rectangle 550 has remained at full opacity for D milliseconds, or at $D+t_d$ milliseconds after $t_0$. In another embodiment, the transition times can be split across the adjacent opaque and transparent time periods. In this embodiment, rectangle 550 remains at full opacity for $D-t_d/2$ milliseconds ($t_d/2$ milliseconds before $t_1$) and rectangle 552 reaches full transparency at $t_d/2$ milliseconds after $t_1$.

Returning to the timing pattern shown in FIG. 5B, the first inter-panel transition, of the opaque state from panel 504 to panel 506, begins with an opaque to transparent transition that begins with application of a switching voltage at time $t_1-t_d$ and lasts for $t_d$ milliseconds. At time $t_1$, the panel 504 is substantially transparent, as shown by state 552. As the first panel 504 becomes transparent, the second panel 506 becomes substantially opaque (562) at time $t_1$ as a result of a switching voltage applied at time $t_1-tr$. The panel 506 remains substantially opaque until the start of the second inter-panel transition, which begins with application of a switching voltage to panel 506 at time $t_2-t_d$ and lasts for $t_d$ milliseconds. The panel 506 then becomes substantially transparent (564) at time $t_2$. The second inter-panel transition continues with application of a switching voltage to panel 508 at time $t_2-t_r$, which results in panel 508 becoming substantially opaque (573) at time $t_2$, which is substantially the same time that the panel 506 becomes substantially transparent (564). The first and second panels 504, 506 remain substantially transparent while the third panel 508 is opaque.

A third inter-panel transition returns the opaque state to the first panel 504. The third inter-panel transition begins at time $t_3-t_r$ on panel 504, so that panel 504 becomes substantially opaque by time $t_3$. During this transition period, panel 508 begins transitioning to a transparent state at time $t_3-t_d$ such that panel 508 is substantially transparent at time $t_3$.

Figure 6A:
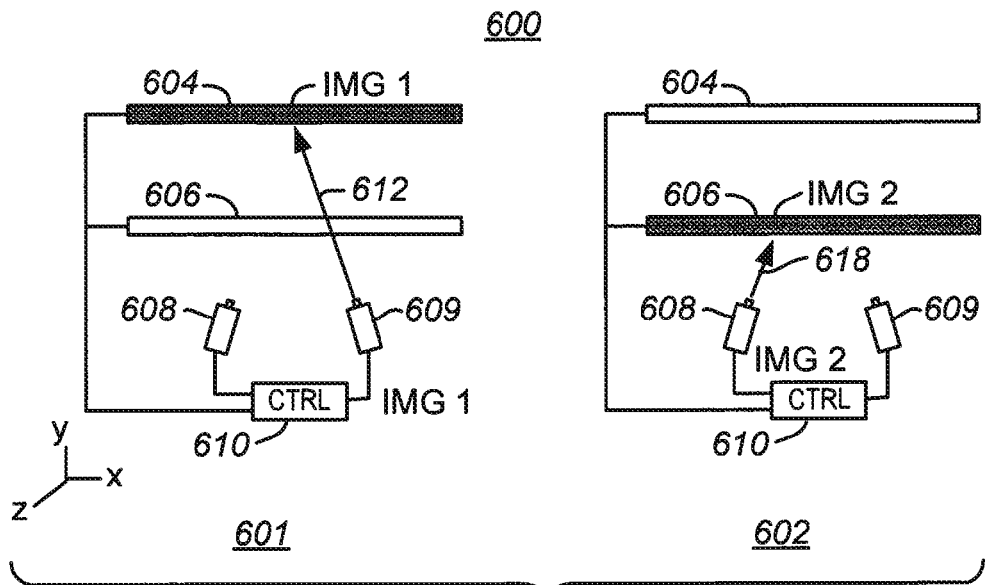
FIGS. 6A and 6B illustrate multi-layer projection displays having two projectors in accordance with embodiments of the invention
Figure 6B:
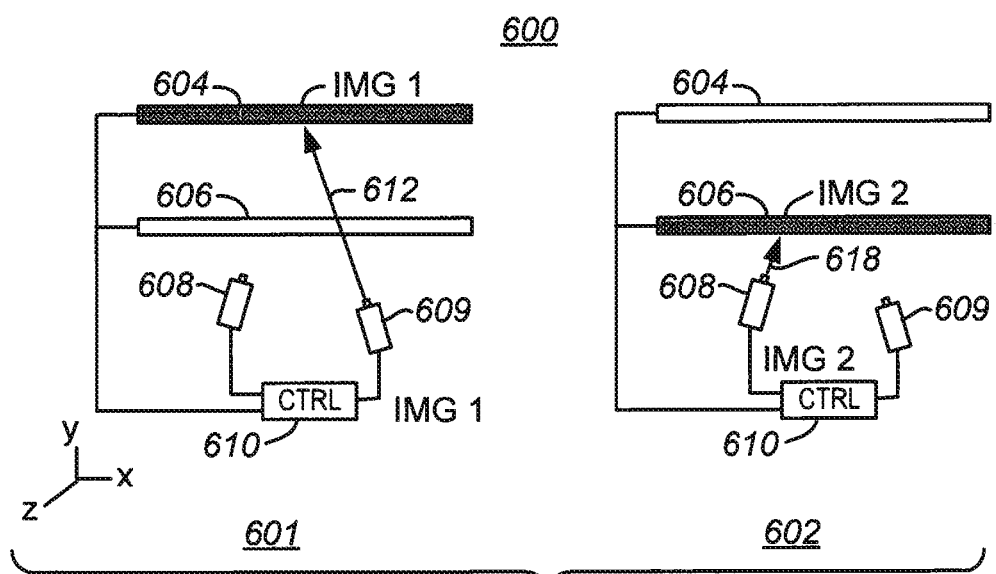

FIGS. 6A and 6B illustrate a multi-layer projection display 600 having two projectors in accordance with embodiments of the invention.

FIG. 6A shows two projectors that project two different images onto two different panels. A first projector 609 projects a first image IMG 1 onto the first panel 604 in state 601, during which the second panel 606 is transparent and the first panel 604 is opaque. A second projector 608 projects a second image IMG 2 onto a second panel 606 in state 602, during which a first panel 604 is transparent and the second panel 606 is opaque. Both projectors are connected to and receive the images from controller 610.

FIG. 6B shows a multi-layer projection display similar to that of FIG. 6A except that projectors 608 and 609 have been modified such that their respective distances away from second panel 606 are different from each other. It should be noted that even though the FIG. 6B shows that projector 608 is set closer to second panel 606 than projector 609, in other embodiments of the invention, projector 609 can be set closer to second panel 606 than projector 608.

Figure 7:
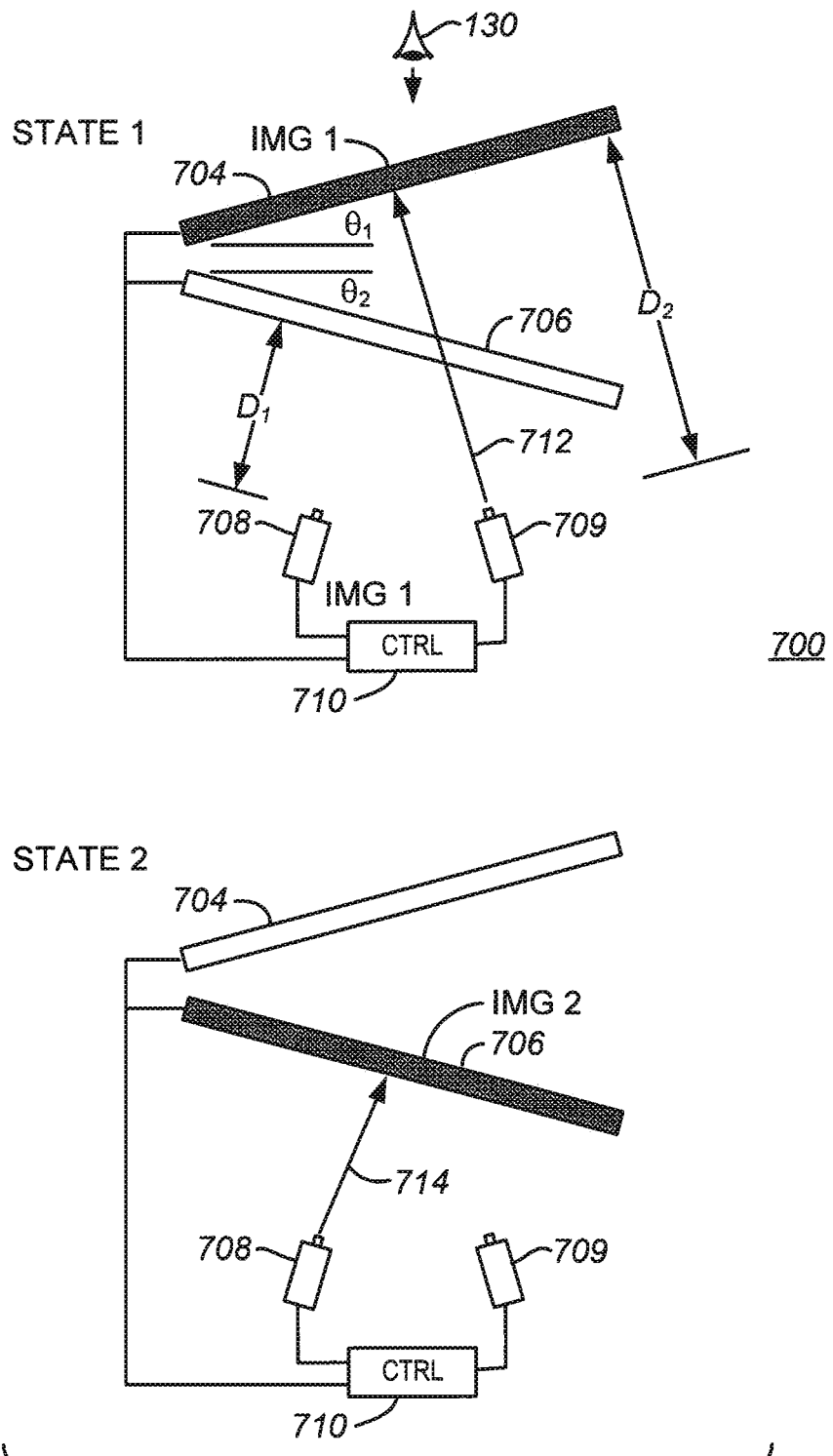
FIG. 7 illustrates a multi-layer projection display having angled panels in accordance with embodiments of the invention.

FIG. 7 illustrates a multi-layer projection display 700 having angled panels in accordance with embodiments of the invention. The projection display is arranged such that first panel 704 is angled towards viewer 130 at a degree $\theta_1$ from the normal to the line of sight of viewer 130, and second panel 706 is angled away from viewer at an angle $\theta_2$ from the normal to the line of sight of the viewer 130. It would be appreciated by one of ordinary skill in the art that in other embodiments of the invention, first panel 704 can be angled away from viewer 130 and second panel 706 can be angled towards viewer 130. Projector 709 is positioned such that beam 712 is projected a distance $D_2$ from projector 709 onto first panel 704 to form image IMG1 on first panel 704, such as demonstrated in STATE 1, when it is substantially opaque. Projector 708 is positioned such that beam 714 is projected a distance $D_1$ from projector 708 to second panel 706 to form image IMG2, such as demonstrated in STATE 2, on second panel 706 when it is substantially opaque. Both projectors are connected to and receive the images from controller 710.

Figure 8:
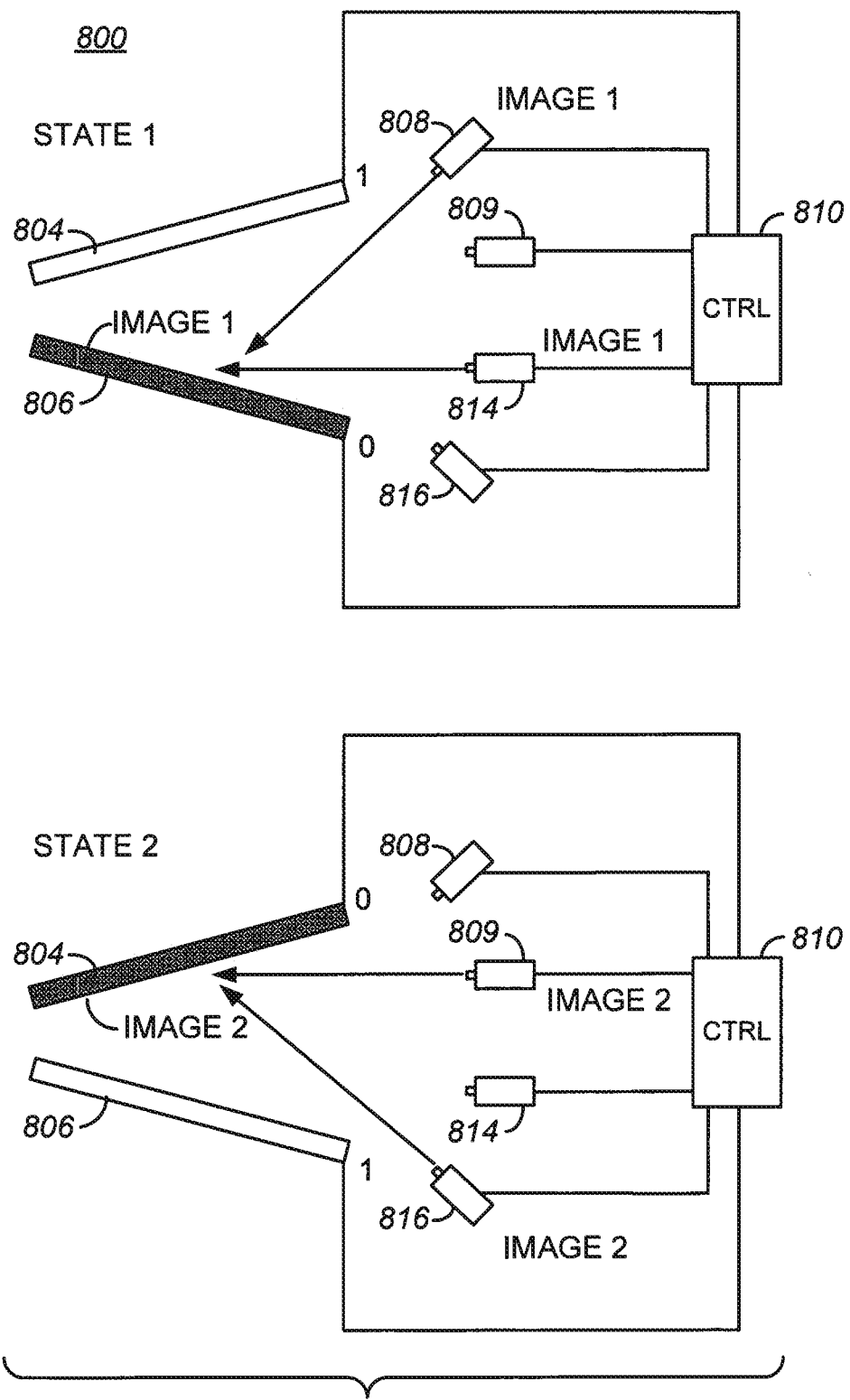
FIG. 8 illustrates a multi-layer projection display having angled panels and four projectors in accordance with embodiments of the invention.

FIG. 8 illustrates a multi-layer projection display 800 having angled panels and four projectors in accordance with embodiments of the invention. The projection display is arranged such that in STATE 1, projectors 808 and 814, controlled by controller 810, can both project beams simultaneously onto first panel 806 when it is substantially opaque in order to form image IMAGE 1. The display is also arranged such that in STATE 2, projectors 809 and 816, also controlled by controller 810, can both project beams simultaneously onto second panel 804 when it is substantially opaque in order to form image IMAGE 2.

Figure 9:
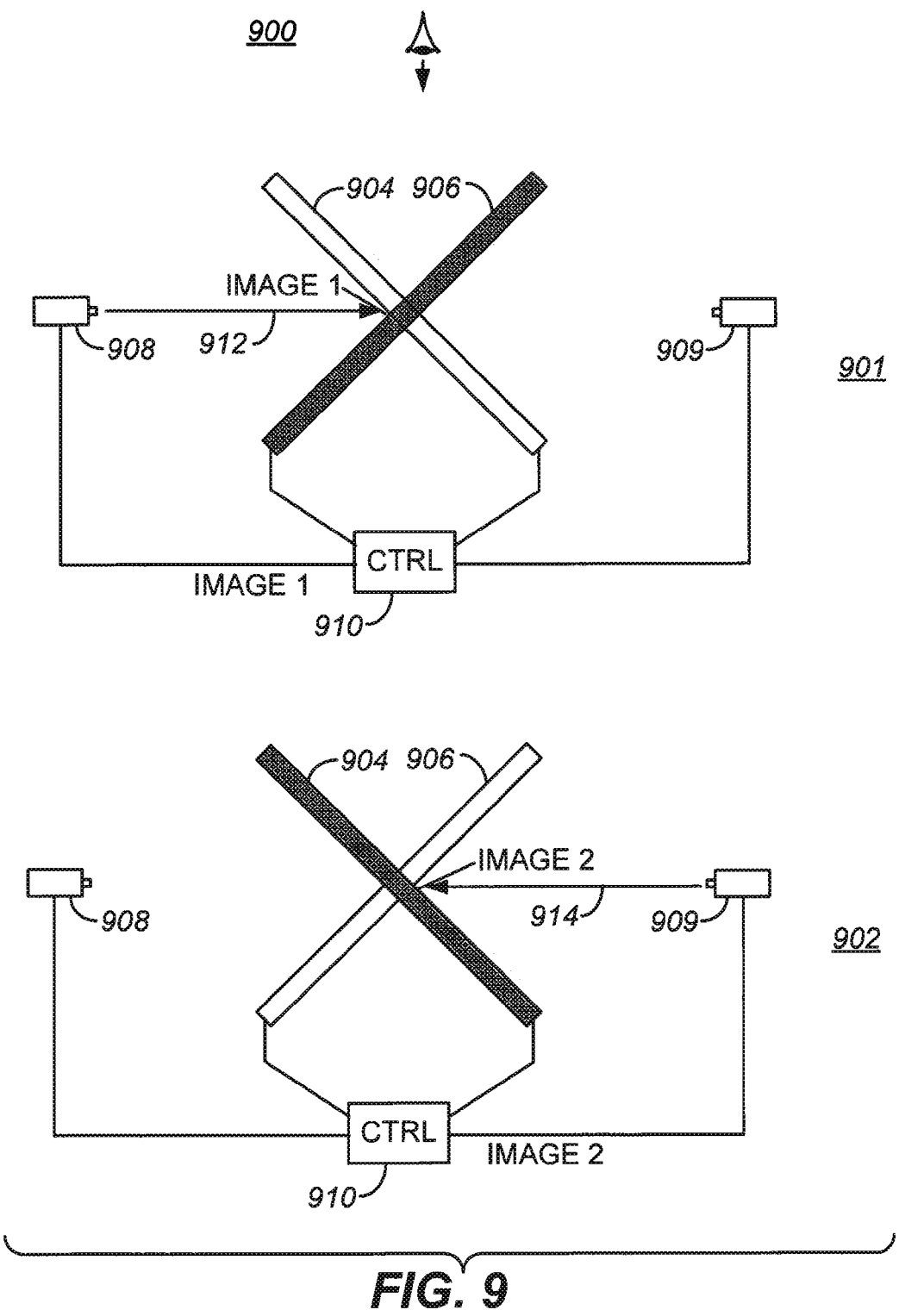
FIG. 9 illustrates a multi-layer projection display having intersecting panels in accordance with embodiments of the invention.

FIG. 9 illustrates a multi-layer projection display 900 having intersecting panels in accordance with embodiments of the invention. The projection display is arranged such that panels 904 and 906 intersect. Projector 908 projects a beam 912 onto panel 906 when panel 906 is substantially opaque and panel 904 is substantially transparent in order to display image IMAGE 1 on panel 906, as illustrated in state 901. Projector 909 projects a beam 914 onto panel 904 when panel 904 is substantially opaque and panel 906 is substantially transparent in order to display image IMAGE 2 on panel 904, as illustrated in state 902. Both projectors are connected to and controlled by controller 910.

Figure 10:
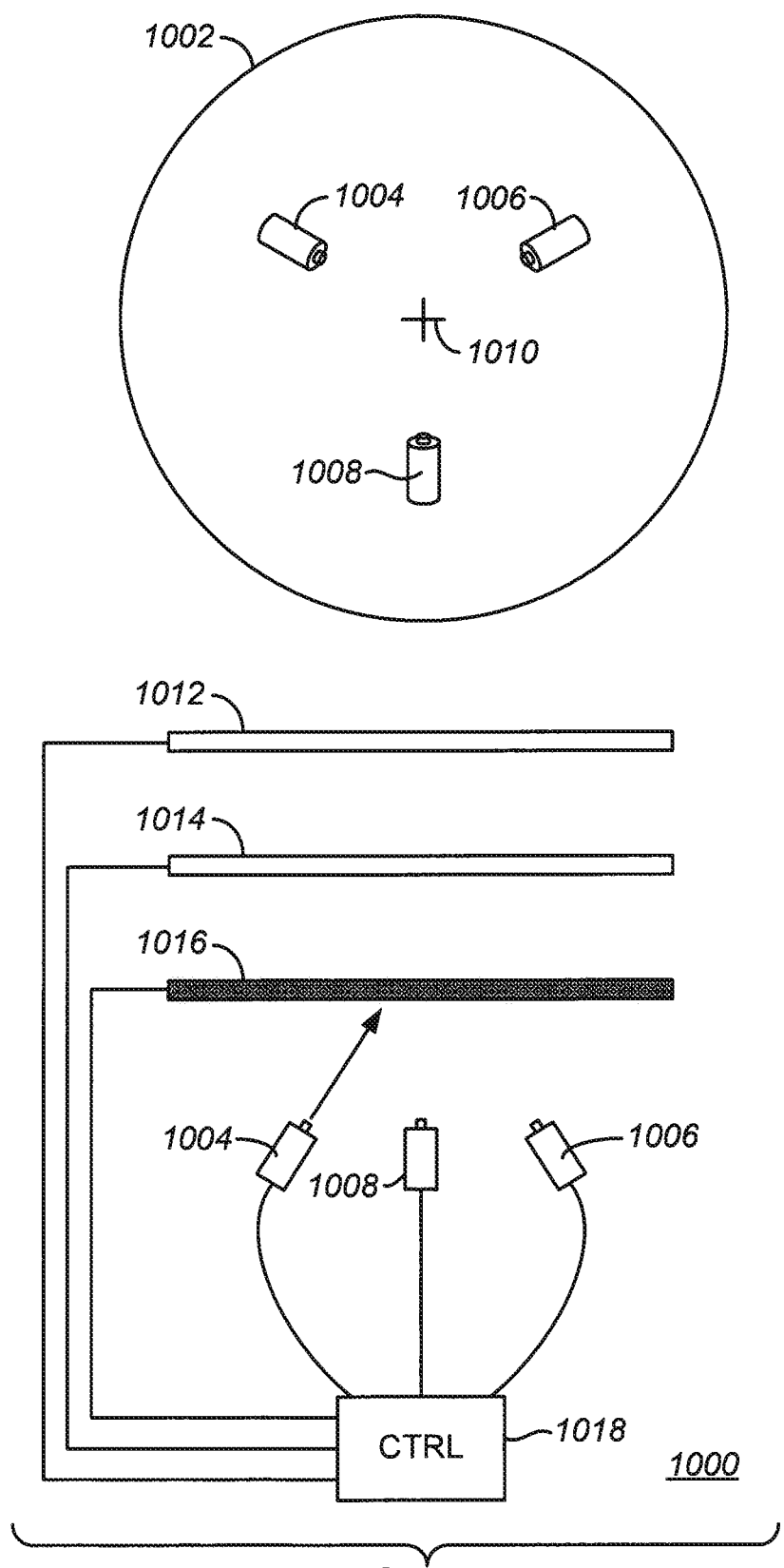
FIG. 10 illustrates a multi-layer projection display having angled projectors directed toward a single location in accordance with embodiments of the invention.

FIG. 10 illustrates a multi-layer projection display 1000 having angled projectors directed toward a single location in accordance with embodiments of the invention. The projection display is arranged such that projector 1004 beams an image onto first panel 1016 when it is substantially opaque and the other two panels are transparent, projector 1008 beams an image onto second panel 1014 when it is substantially opaque and the other two panels are transparent, and projector 1006 beams an image onto third panel 1012 when it is substantially opaque and the other two panels are transparent. All projectors are connected to and controlled by controller 1018. Circular view 1002 represents a top down view horizontal slice of the projected display 1000. Projectors 1004, 1006 and 1008 are arranged in a circular fashion and angled such that each projector beams a light at focal point 1010.

Figure 11:
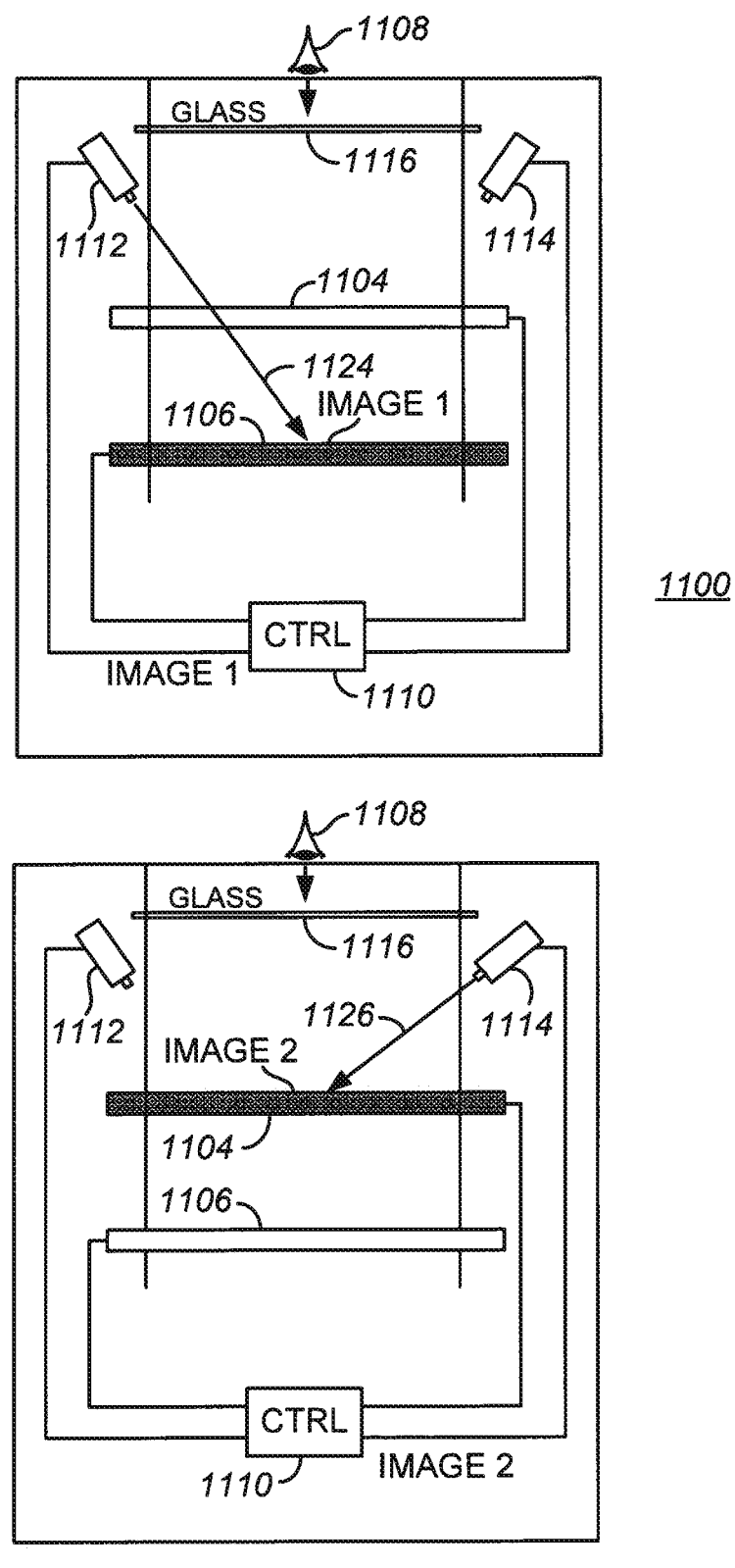
FIG. 11 illustrates a multi-layer projection display having projectors directed away from a viewing location in accordance with embodiments of the invention.

FIG. 11 illustrates a multi-layer projection display 1100 having projectors directed away from a viewer 1108 in accordance with embodiments of the invention. Projectors 1112 and 1114 are connected to controller 1110 and are positioned such that beams 1124 and 1126 are projected away from viewer 1108 toward panels 1106 and 1104 to display images IMAGE 1 and IMAGE 2 on the panels respectively. As with the above described embodiments of the invention, the panels alternate between substantially transparent and substantially opaque states in syncopation such that viewer 1108 can view the images through glass 1116.

Figure 12A:
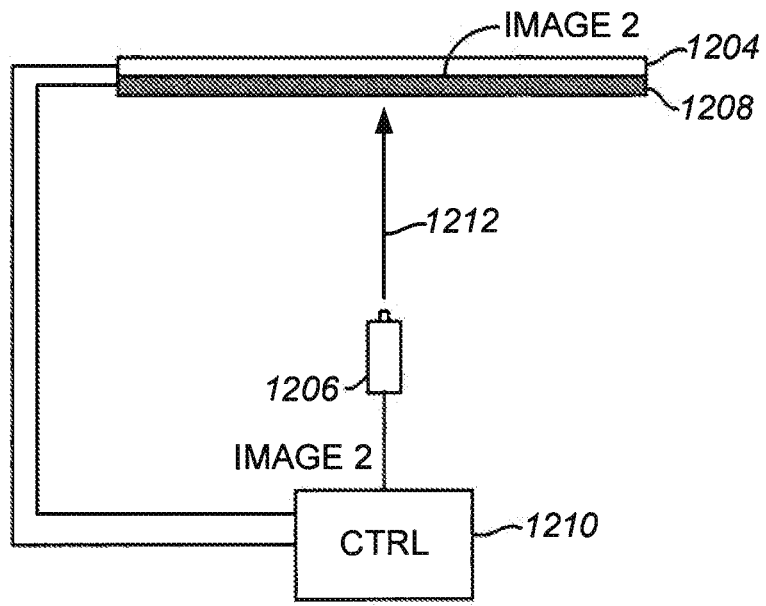
FIGS. 12A and 12B illustrate multi-layer projection displays having substantially adjacent panels in accordance with embodiments of the invention.
Figure 12A:
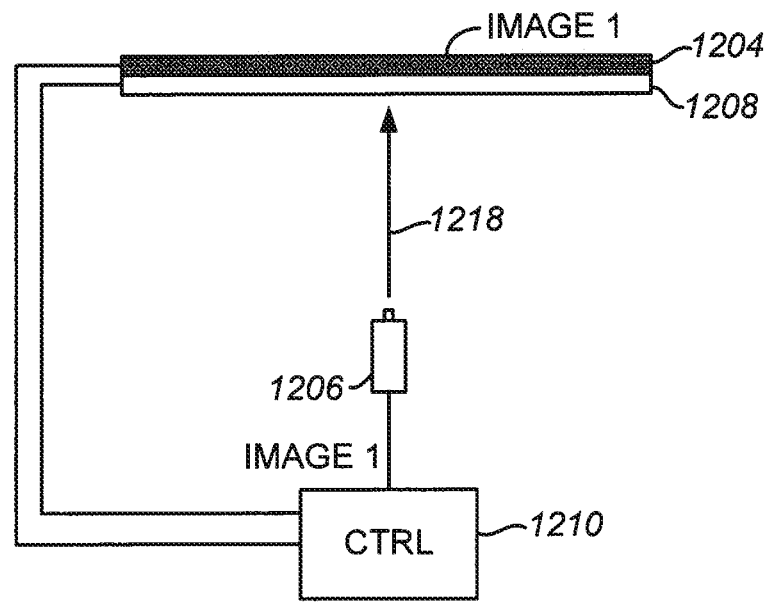
Figure 12B:
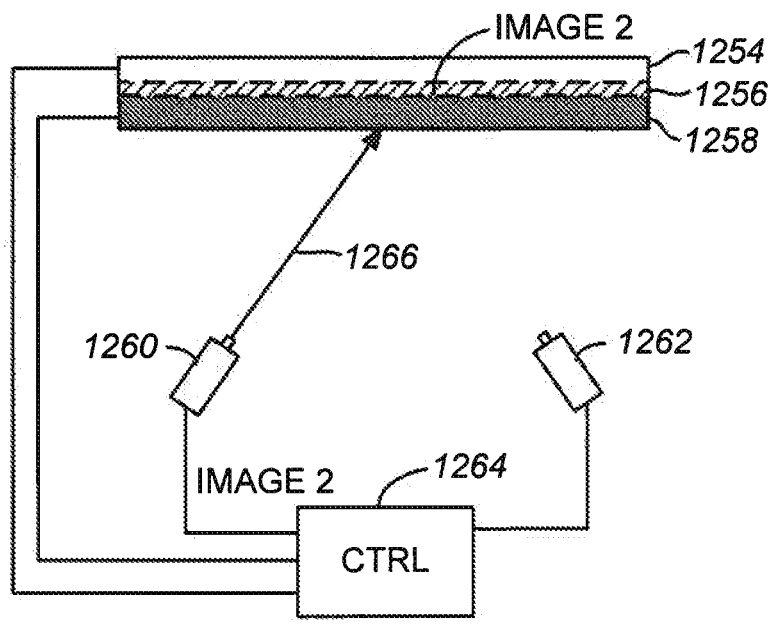
Figure 12B:
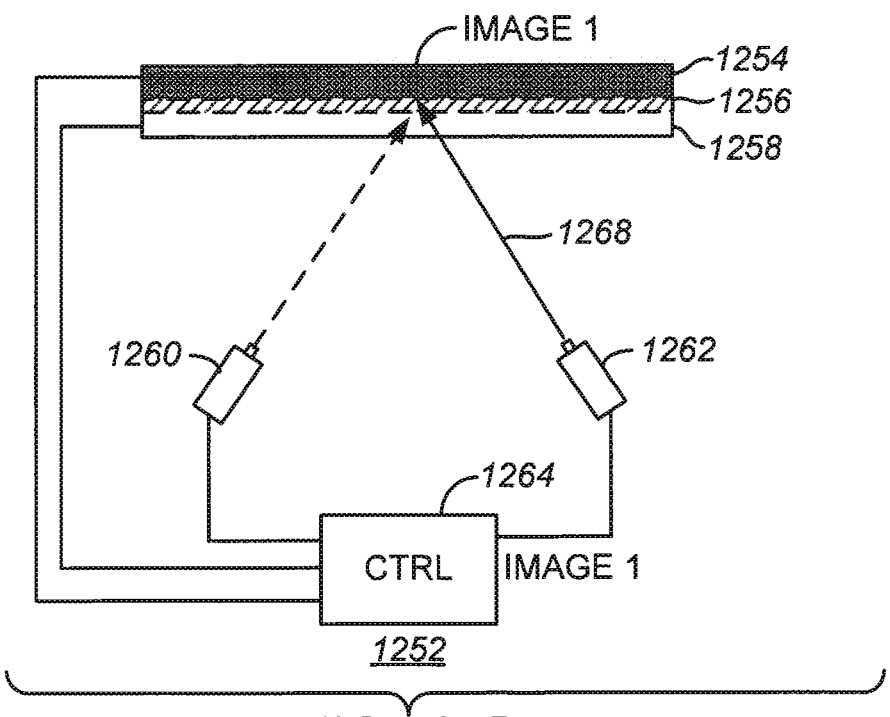

FIGS. 12A and 12B illustrate multi-layer projection displays 1200 and 1250 having substantially adjacent panels in accordance with embodiments of the invention. FIG. 12A is substantially similar to that of FIG. 1A, except that there is no space between adjacent panels 1204 and 1208. In state 1201, projector 1206 projects beam 1212, received from controller 1210, onto substantially opaque panel 1208 forming image IMAGE 2 onto panel 1208 while panel 1204 is substantially transparent. In state 1202, projector 1206 projects beam 1218, received from controller 1210, onto substantially opaque panel 1204 forming image IMAGE 1 onto panel 1204 while panel 1208 is substantially transparent.

FIG. 12B is similar to FIG. 12A except that two projectors are used in alternation instead of one and a buffer layer 1256, made of any transparent material, is positioned between panels 1254 and 1258. In state 1251, projector 1260, connected to controller 1264, projects beam 1266 onto substantially opaque panel 1258 forming image IMAGE 2 while panel 1254 is substantially transparent. In state 1252, projector 1262, connected to controller 1264, projects beam 1268 onto substantially opaque panel 1254 forming image IMAGE 1 while panel 1258 is substantially transparent.

Figure 13:
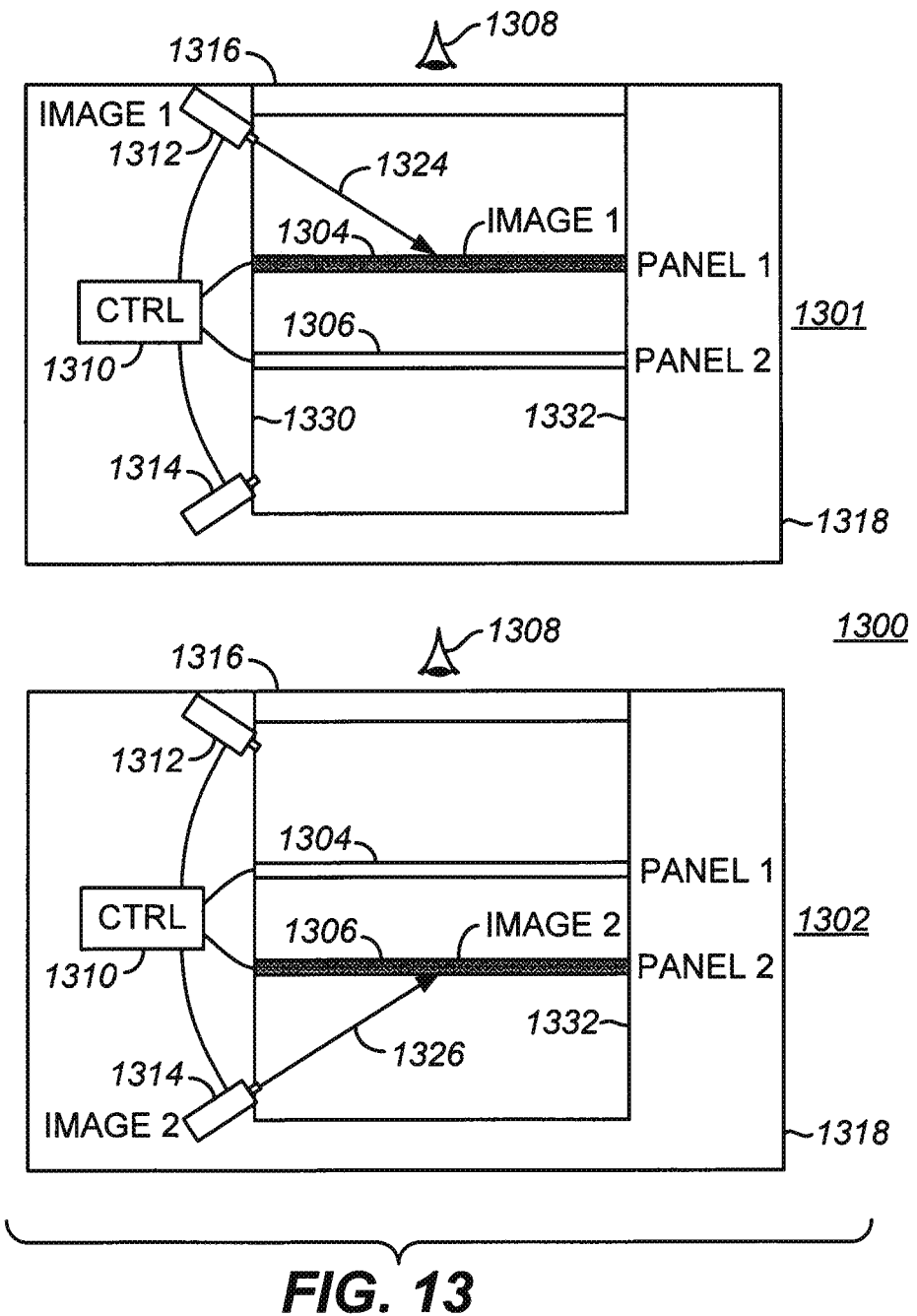
FIG. 13 illustrates a multi-layer projection display having panels located between projectors in accordance with embodiments of the invention.

FIG. 13 illustrates a multi-layer projection display having panels located between projectors in accordance with embodiments of the invention. Panels 1304 and 1306 are coupled to controller 1310, which is also coupled to projectors 1312 and 1314. The panels, controller and projectors are all embedded within gaming machine 1318. The projectors are arranged such that projector 1312 is directed away from viewer 1308 and projects beam 1324 onto panel 1304 to form image IMAGE 1 on panel 1304 when it is substantially opaque and panel 1306 is substantially transparent, such as demonstrated in state 1301. Projector 1314 is arranged such that it is directed towards viewer 1308 and projects beam 1326 onto panel 1306 to form image IMAGE 2 when panel 1306 is substantially opaque and panel 1304 is substantially transparent, such as demonstrated in state 1302. Viewer 1308 views the images through viewing glass 1316.

Figure 14:
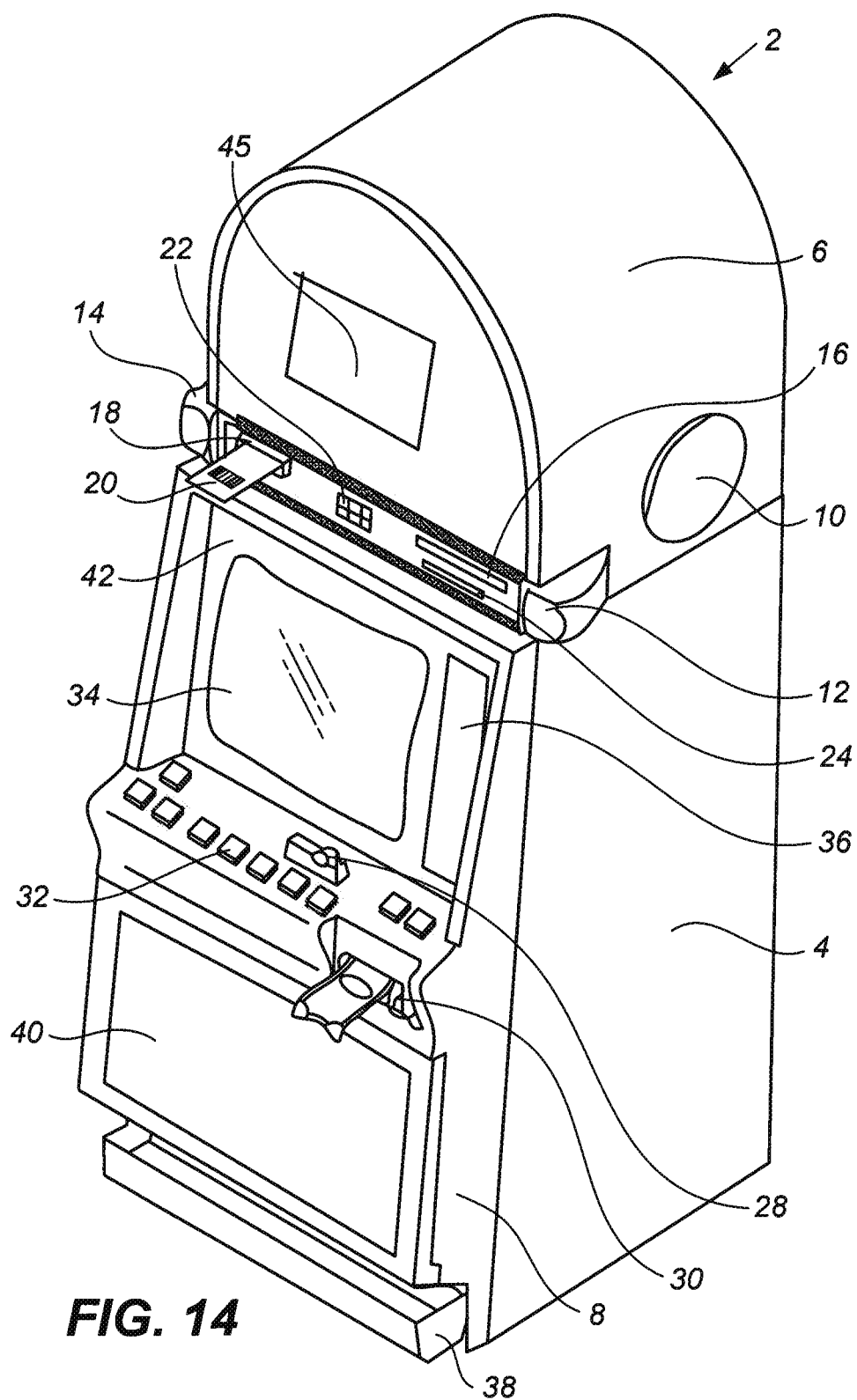
FIG. 14 depicts a gaming machine.

Turning next to FIG. 14, a video gaming machine 2 of the present invention is shown. The gaming machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 may be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video blackjack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 further includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 45. The ticket printer 18 may be used to print tickets for a cashless ticketing system. Further, the top box 6 may house different or additional devices than shown in FIG. 14. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, such as IGT gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001, and titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 14, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions that affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Some networks described herein provide methods and devices for managing one or more networked gaming establishments. Such networks may sometimes be referred to herein as server-based gaming networks, sb™ networks, or the like. Some such gaming networks allow for the convenient provisioning of networked gaming machines and other devices relevant to casino operations. Game themes may be easily and conveniently added or changed, if desired. Related software, including but not limited to player tracking software, peripheral software, etc., may be downloaded to networked gaming machines, mobile gaming devices, thin clients and/or other devices, such as kiosks, networked gaming tables, player stations, etc.

In some implementations, servers or other devices of a central system will determine game outcomes and/or provide other wager gaming functionality. In some such implementations, wagering games may be executed primarily on one or more devices of a central system, such as a server, a host computer, etc. For example, wager gaming determinations (such as interim and final game outcomes, bonuses, etc.) may be made by one or more servers or other networked devices. Player tracking functions, accounting functions and even some display-related functions associated with wagering games may be performed, at least in part, by one or more devices of casino network and/or of a central system.

Gaming establishment also includes networked kiosks. Depending on the implementation, kiosks may be used for various purposes, including but not limited to cashing out, prize redemption, redeeming points from a player loyalty program, redeeming "cashless" indicia such as bonus tickets, smart cards, etc. In some implementations, kiosks may be used for obtaining information about the gaming establishment, e.g., regarding scheduled events (such as tournaments, entertainment, etc.), regarding a patron's location, etc. Software related to such features may be provided and/or controlled, and related data may be obtained and/or provided, according to the present invention. For example, in some implementations of the invention, kiosks may be configured to receive information from a patron, e.g., by presenting graphical user interfaces.

Although various communication protocols may be used, some preferred implementations use the Gaming Standards Association's G2S Message Protocol. Other implementations may use IGT's open, Ethernet-based SuperSAS® protocol, which IGT makes available for downloading without charge. Still other protocols, including but not limited to Best of Breed ("BOB"), may be used to implement various aspects of the invention. IGT has also developed a gaming-industry-specific transport layer called CASH that rides on top of TCP/IP and offers additional functionality and security.

A gaming establishment may also includes an RFID network, implemented in part by RFID switches and multiple RFID readers. An RFID network may be used, for example, to track objects (such as mobile gaming devices, which include RFID tags in this example), patrons, etc., in the vicinity of a gaming establishment. Some examples of how an RFID network may be used in a gaming establishment are set forth in U.S. patent application Ser. No. 11/655,496, entitled "DYNAMIC CASINO TRACKING AND OPTIMIZATION" and filed on Jan. 19, 2007 and in U.S. patent application Ser. No. 11/599,241, entitled "DOWNLOADING UPON THE OCCURRENCE OF PREDETERMINED EVENTS" and filed on Nov. 13, 2006, all of which are hereby incorporated by reference.

As noted elsewhere, some implementations of the invention may involve "smart" player loyalty instruments, such as player tracking cards, which include an RFID tag. Accordingly, the location of such RFID-enabled player loyalty instruments may be tracked via the RFID network. In this example, at least some of the mobile devices may include an RFID tag, which includes encoded identification information for a mobile device. Accordingly, the locations of such tagged mobile devices 870 may be tracked via the RFID network in a gaming establishment. Other location-detection devices and systems, such as the global positioning system ("GPS"), may be used to monitor the location of people and/or devices in the vicinity of a gaming establishment or elsewhere.

Various alternative network topologies can be used to implement different aspects of the invention and/or to accommodate varying numbers of networked devices. For example, gaming establishments with large numbers of gaming machines may require multiple instances of some network devices (e.g., of main network device, which combines switching and routing functionality in this example) and/or the inclusion of other network devices. Some implementations of the invention may include one or more middleware servers disposed between kiosks, RFID switches and/or bank switches and one or more devices in computer room (e.g., a corresponding server). Such middleware servers can provide various useful functions, including but not limited to the filtering and/or aggregation of data received from switches, from individual gaming machines and from other devices. Some implementations of the invention include load-balancing methods and devices for managing network traffic.

One or more devices in a central system may also be configured to perform, at least in part, tasks specific to the present invention. For example, one or more servers, arbiter, storage devices and/or host devices of the central system may be configured to implement the functions described in detail elsewhere herein.

One or more of the servers may be configured with software for receiving a player's wager gaming notification parameters, determining when a wagering condition corresponds with the wager gaming notification parameters and/or providing a notification to the player when the wagering condition corresponds with the wager gaming notification parameters. Moreover, one or more of the servers may be configured to receive, process and/or provide image data from cameras, to provide navigation data to patrons (e.g., to indicate the location of and/or directions to a gaming table, a wager gaming machine, etc., associated with a wager gaming notification), etc.

For example, navigation data (which may include map data, casino layout data, camera image data, etc.) may be provided by one or more of the servers to mobile devices. Some implementations include a plurality of networked cameras, which may be video cameras, smart cameras, digital still cameras, etc. In some such implementations, such cameras may provide, at least in part, real-time navigation features such as those described in U.S. patent application Ser. No. 12/106,771, entitled "Real-Time Navigation Devices, Systems and Methods," which is incorporated herein by reference.

The servers and other devices may be configured for communication with other devices in or outside of a gaming establishment, such as host devices, kiosks and/or mobile devices, for implementing some methods described elsewhere herein. Servers (or the like) may facilitate communications with such devices, receive and store patron data, provide appropriate responses, etc., as described elsewhere herein.

Some of these servers may be configured to perform tasks relating to accounting, player loyalty, bonusing/progressives, configuration of gaming machines, etc. One or more such devices may be used to implement a casino management system, such as the IGT Advantage™ Casino System suite of applications, which provides instantaneous information that may be used for decision-making by casino managers. A Radius server and/or a DHCP server may also be configured for communication with the gaming network. Some implementations of the invention provide one or more of these servers in the form of blade servers.

Some preferred embodiments of a sb™ server and the other servers include (or are at least in communication with) clustered CPUs, redundant storage devices, including backup storage devices, switches, etc. Such storage devices may include a "RAID" (originally redundant array of inexpensive disks, now also known as redundant array of independent disks) array, back-up hard drives and/or tape drives, etc.

In some implementations, many of these devices (including but not limited to a license manager, servers, and main network device) are mounted in a single rack with sb™ server. Accordingly, many or all such devices will sometimes be referenced in the aggregate as an "sb™ server." However, in alternative implementations, one or more of these devices is in communication with sb™ server and/or other devices of the network but located elsewhere. For example, some of the devices could be mounted in separate racks within a computer room or located elsewhere on the network. Moreover, it can be advantageous to store large volumes of data elsewhere via a storage area network ("SAN").

A computer room may include one or more operator consoles or other host devices that are configured for communication with other devices within and outside of the computer room. Such host devices may be provided with software, hardware and/or firmware for implementing various aspects of the invention. However, such host devices need not be located within the computer room. Wired host devices (which are desktop and laptop computers in this example) and wireless devices (which are PDAs in this example) may be located elsewhere in a gaming establishment or at a remote location.

Some embodiments include devices for implementing access control, security and/or other functions relating to the communication between different devices on the network. In one example, an arbiter serves as an intermediary between different devices on the network. The arbiter may be implemented, for example, via software that is running on a server or another networked device. Some implementations of an arbiter are described in U.S. patent application Ser. No. 10/948,387, entitled "METHODS AND APPARATUS FOR NEGOTIATING COMMUNICATIONS WITHIN A GAMING NETWORK" and filed Sep. 23, 2004 (the "Arbiter Application"), which is incorporated herein by reference and for all purposes. In some implementations, the arbiter is a repository for the configuration information required for communication between devices on the gaming network (and, in some implementations, devices outside the gaming network). Although the arbiter 833 can be implemented in various ways, one exemplary implementation is discussed in the following paragraphs.

The arbiter may include an arbiter controller that may comprise a program memory, a microcontroller or microprocessor (MP), a random-access memory (RAM) and an input/output (I/O) circuit, all of which may be interconnected via an address/data bus. A network computer, which is part of the communication topology of the gaming machines and the arbiter, may also include a controller that may comprise a program memory, a microcontroller or microprocessor (MP), a random-access memory (RAM) and an input/output (I/O) circuit, all of which may be interconnected via an address/data bus. It should be appreciated that although the arbiter and the network computer are each described as having only one microprocessor, the controllers may each include multiple microprocessors. Similarly, the memory of the controllers may include multiple RAMs and multiple program memories. Although the I/O circuits are each shown as a single block, it should be appreciated that the I/O circuits may include a number of different types of I/O circuits. The RAMs and program memories may be implemented as semiconductor memories, magnetically readable memories, and/or optically readable memories, for example.

Although the program memories are described as read-only memories (ROM) the program memories of the controllers may be a read/write or alterable memory, such as a hard disk. In the event a hard disk is used as a program memory, the address/data buses may each comprise multiple address/data buses, which may be of different types, and there may be an I/O circuit disposed between the address/data buses.

Communications between the gaming machines and a network computer may involve different information types of varying levels of sensitivity resulting in varying levels of encryption techniques depending on the sensitivity of the information. For example, communications such as drink orders and statistical information may be considered less sensitive. A drink order or statistical information may remain encrypted, although with moderately secure encryption techniques, such as RC4, resulting in less processing power and less time for encryption. On the other hand, financial information (e.g., account information, winnings, etc.), download information (e.g., game and/or peripheral software, licensing information, etc.) and personal information (e.g., social security number, personal preferences, etc.) may be encrypted with stronger encryption techniques such as DES or 3DES to provide increased security.

As disclosed in further detail in the Arbiter Application, the arbiter may verify the authenticity of devices in the gaming network, including but not limited to devices sending queries and/or remote procedure calls to gaming machines. The arbiter may receive a request for a communication session from a network device. For ease of explanation, the requesting network device may be referred to as the client, and the requested network device may be referred to as the host. The client may be any device on the network and the request may be for a communication session with any other network device. The client may specify the host, or the gaming security arbiter may select the host based on the request and based on information about the client and potential hosts. The arbiter may provide encryption keys (session keys) for the communication session to the client via the secure communication channel. Either the host and/or the session key may be provided in response to the request, or may have been previously provided. The client may contact the host to initiate the communication session. The host may then contact the Arbiter to determine the authenticity of the client. The arbiter may provide affirmation (or lack thereof) of the authenticity of the client to the host and provide a corresponding session key, in response to which the network devices may initiate the communication session directly with each other using the session keys to encrypt and decrypt messages.

Alternatively, upon receiving a request for a communication session, the Arbiter may contact the host regarding the request and provide corresponding session keys to both the client and the host. The Arbiter may then initiate either the client or the host to begin their communication session. In turn, the client and host may begin the communication session directly with each other using the session keys to encrypt and decrypt messages. An additional explanation of the communication request, communication response and key distribution is provided in the Arbiter Application.

The communication link(s) network between a casino and a central system preferably have ample bandwidth and may, for example, comprise one or more T1 or T3 connections and/or satellite links having comparable bandwidth, etc. The Internet is an example of such a network. However, it will be understood by those of skill in the art that a network could include any one of various types of networks, such as the public switched telephone network ("PSTN"), a satellite network, a wireless network, a metro optical transport, etc. Accordingly, a variety of protocols may be used for communication on a network, such as Internet Protocol ("IP"), Fibre Channel ("FC"), FC over IP ("FCIP"), Internet SCSI ("iSCSI," an IP-based standard for linking data storage devices over a network and transferring data by carrying SCSI commands over IP networks) or Dense Wavelength Division Multiplexing ("DWDM," an optical technology used to increase bandwidth over existing fiber optic backbones).

If a host device is located in a remote location, security methods and devices (such as firewalls, authentication and/or encryption) should be deployed in order to prevent the unauthorized access of the gaming network.

Similarly, any other connection between a gaming network and the outside world should only be made with trusted devices via a secure link, e.g., via a virtual private network ("VPN") tunnel. For example, the connection between a sb™ server, a gateway and central system (that may be used for communications involving peripheral device software downloads, etc.) is advantageously made via a VPN tunnel. Details of VPN methods are described in the reference, "Virtual Private Networks-Technologies and Solutions," by R. Yueh and T. Strayer, Addison-Wesley, 2001, ISBN#0-201-70209-6, which is incorporated herein by reference and for all purposes. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols, including RFC reports, may be obtained from the VPN Consortium, an industry trade group (http://www.vpnc.com, VPNC, Santa Cruz, Calif.).

Alternatively, a permanent virtual circuit ("PVC") can be established to provide a dedicated and secure circuit link between two facilities, e.g., between a casino and a central system. A PVC is a virtual circuit established for repeated use between the same data terminals. A PVC could be provided, for example, via AT&T's Asynchronous Transfer Mode ("ATM") switching fabric. Some implementations provide a dedicated line from an endpoint (e.g., from a casino) into the ATM backbone. Other implementations provide a connection over another network (e.g., the Internet) between an endpoint and the nearest device of the ATM backbone, e.g., to the nearest edge router. In some such implementations, the fixed-sized cells used in the ATM switching fabric may be encapsulated in variable sized packets (such as Internet Protocol or Ethernet packets) for transmission to and from the ATM backbone.

For security purposes, information transmitted to, on or from a gaming establishment may be encrypted. In one implementation, the information may be symmetrically encrypted using a symmetric encryption key, where the symmetric encryption key is asymmetrically encrypted using a private key. The public key may, for example, be obtained from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. A different symmetric encryption key is used for each transaction where the key is randomly generated. Symmetric encryption and decryption is preferably applied to most information because symmetric encryption algorithms tend to be 100-10,000 faster than asymmetric encryption algorithms.

Some network implementations may use Trusted Network Connect ("TNC"), which is an open architecture provided by the Trusted Network Connect Sub Group ("TNC-SG") of the Trusted Computing Group (TCG). TNC enables network operators to provide endpoint integrity at every network connection, thus enabling interoperability among multi-vendor network endpoints. Alternatively, or additionally, the Secure Internet File Transfer ("SIFT") may be employed. SIFT allows devices to send and receive data over the Internet in a secure (128-bit encryption) method of transport.

Providing secure connections between devices in a gaming network, such as the connections between the local devices of a gaming network and a central system, allows for the deployment of many advantageous features. For example, a customer (e.g., an employee of a gaming establishment) may be able to log onto an account of a central system to obtain the account information such as the customer's current and prior account status.

Automatic updates of a customer's software may also be enabled. For example, a central system may notify one or more devices in a gaming establishment regarding new products and/or product updates. For example, the central system may notify a server (or other device) in a computer room regarding new software, software updates, the status of current software licenses, etc. Alternatively, such updates could be automatically provided to a server in a computer room and downloaded to networked gaming machines.

After the local server receives this information, relevant products of interest may be identified (by the server, by another device or by a human being). If an update or a new software product is desired, it can be downloaded from the central system. Similarly, a customer may choose to renew a software license via a secure connection with central system 863, e.g., in response to a notification that the software license is required.

In addition, providing secure connections between different gaming establishments can enable alternative implementations of the invention. For example, a number of gaming establishments may be owned and/or controlled by the same entity. In such situations, having secure communications between gaming establishments makes it possible for a gaming entity to use one or more servers in a gaming establishment as an interface between a central system and gaming machines in multiple gaming establishments. For example, new or updated software may be obtained by a server in one gaming establishment and distributed to gaming machines in that gaming establishment and/or other gaming establishments. A server in one gaming establishment may perform services, such as patron identification services, in response to a request from a device in another gaming establishment.

Because information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

The above-described devices and materials will be familiar to those of skill in the gaming industry and/or in the computer hardware and software arts. Although many of the components and processes are described above in the singular for convenience, it will be appreciated by one of skill in the art that multiple components and repeated processes can also be used to practice the techniques of the present invention.

Although illustrative embodiments and applications of this invention are shown and described herein, many variations and modifications are possible which remain within the concept, scope, and spirit of the invention, and these variations should become clear after perusal of this application. Accordingly, the present embodiments are to be considered as illustrative and not restrictive, and the invention is not to be limited to the details given herein, but may be modified within the scope and equivalents of the appended claims.

We claim:

1. A multi-layer projection display comprising:
    first and second panels separated by a predetermined distance, wherein at least a portion of the first panel overlaps at least a portion of the second panel, and the first panel is disposed between a viewing location and the second panel;
    a controller configured to cause the first and second panels to alternate between substantially opaque and substantially transparent states at a determined frequency, such that the first panel is substantially opaque when the second panel is substantially transparent, and the second panel is substantially opaque when the first panel is substantially transparent; and a projector configured to project an image onto the first panel when the first panel is substantially opaque, and further configured to project the image onto the second panel when the second panel is substantially opaque.

2. The multi-layer projection display of claim 1, wherein the image projected onto the first panel is visible at the viewing location when the image is projected onto the first panel, and the image projected onto the second panel is visible at the viewing location when the image is projected onto the second panel.

3. The multi-layer projection display of claim 1, wherein no image is visible on the second panel when the image is projected onto the first panel, and no image is visible on the first panel when the image is projected onto the second panel.

4. The multi-layer projection display of claim 1, wherein the first panel is positioned such that a line of sight passes from the viewing location through the first panel to the projector.

5. The multi-layer projection display of claim 1, wherein the second panel is disposed between the first panel and the projector.

6. The multi-layer projection display of claim 5, wherein the first and second panels are positioned such that a line of sight passes from the viewing location through the first and second panels to the projector.

7. The multi-layer projection display of claim 5, wherein the projector is configured to project the image onto the first panel through the second panel when the second panel is substantially transparent, and the image projected onto the second panel is visible at the viewing location through the first panel when the first panel is substantially transparent.

8. The multi-layer projection display of claim 5, wherein the first and second panels are positioned such that a line of sight passes from the viewing location through the first and second panels to the projector.

9. The multi-layer projection display of claim 1, wherein the determined frequency is sufficient to cause the images projected onto the first and second panels to appear to a human user as a single image that includes both of the projected images.

10. The multi-layer projection display of claim 1, wherein the determined frequency is at least 60 transitions between the opaque and transparent states per second.

11. The multi-layer projection display of claim 1, wherein the controller is operable to cause the first or second panel to become substantially opaque by applying a first voltage to the first or second panel, respectively, and further operable to cause the first or second panel to become substantially transparent by applying a second voltage to the first panel or second panel, respectively.

12. The multi-layer projection display of claim 1, wherein the projector is configured to project a second image onto the second panel when the second panel is substantially opaque.

13. The multi-layer projection display of claim 1, further comprising a second projector configured to project a second image onto the second panel when the second panel is substantially opaque.

14. The multi-layer projection display of claim 1, wherein the first projector is configured to project a blank image onto the second panel when the second panel is substantially opaque.

15. A multi-layer projection display comprising:

first and second panels separated by a predetermined distance, wherein at least a portion of the first panel overlaps at least a portion of the second panel, and the first panel is disposed between a viewing location and the second panel;

each panel configured to become substantially transparent in response to application of a first voltage to the respective panel, and further configured to become substantially opaque in response to application of a second voltage to the respective panel;

a controller configured to cause the first and second voltages to alternate between the first voltage level and the second voltage level at a determined frequency such that the first panel is substantially opaque when the second panel is substantially transparent, and the second panel is substantially opaque when the first panel is substantially transparent; and a first projector configured to project a first image onto the first panel when the first panel is substantially opaque, a second projector configured to project a second image onto the second panel when the second panel is substantially opaque, wherein the first image is visible and the second image is not is visible at the viewing location when the first image is projected onto the first panel, and wherein the second image is visible and the first image is not visible at the viewing location when the second image is projected onto the second panel.

16. The multi-layer projection display of claim 15, wherein the first image is visible at the viewing location when the first panel is substantially opaque.

17. The multi-layer projection display of claim 16, wherein the second image is visible at the viewing location when the second panel is substantially opaque.

18. The multi-layer projection display of claim 15, wherein the second panel is disposed between the first panel and the first and second projectors.

19. The multi-layer projection display of claim 18, wherein the first projector is configured to project the first image onto the first panel through the second panel when the second panel is substantially transparent, and the second image projected onto the second panel is visible at the viewing location through the first panel when the first panel is substantially transparent.

20. The multi-layer projection display of claim 18, wherein the first and second panels are positioned such that a line of sight passes from the viewing location through the first and second panels to the first projector, and a line of sight passes from the viewing location through the first and second panels to the second projector.

21. The multi-layer projection display of claim 15, wherein the determined frequency is sufficient to cause the images projected onto the first and second panels to appear to a human user as a single image that includes both of the projected images.

22. The multi-layer projection display of claim 15, wherein the controller is operable to cause the first or second panel to become substantially opaque by applying a first voltage to the first or second panel, respectively, and further operable to cause the first or second panel to become substantially transparent by applying a second voltage to the first panel or second panel, respectively.

23. The multi-layer projection display of claim 15, wherein the second projector is configured to project a second image onto the second panel when the second panel is substantially opaque.

24. A multi-layer projection display comprising:
first, second, and third panels, the first and second panels and the second and third panels separated by a predetermined distance, wherein at least a portion of the first panel overlaps at least a portion of the second panel and at least a portion of the third panel,
the first panel is disposed between a viewing location and the second panel, and
the second panel is disposed between the first panel and the third panel;
a controller configured to cause the first, second, and third panels to alternate between substantially opaque and substantially transparent states at a determined frequency that defines a plurality of time periods, such that only one of the panels is substantially opaque during a least a portion of each of the plurality of time periods;
a projector configured to project an image onto one of the panels when the one of the panels is substantially opaque; and
wherein the image projected onto the one panel is visible, and no image is visible on the other panels, at the viewing location when the image is projected onto the one panel.

25. The multi-layer projection display of claim 24, wherein the image projected onto the first panel is visible at the viewing location when the first panel is substantially opaque.

26. The multi-layer projection display of claim 25, wherein the image projected onto the second panel is visible at the viewing location when the second panel is substantially opaque.

27. The multi-layer projection display of claim 26, wherein the image projected onto the third panel is visible at the viewing location when the third panel is substantially opaque.

28. The multi-layer projection display of claim 24, wherein the first panel is positioned such that a line of sight passes from the viewing location through the first panel to the projector.

29. The multi-layer projection display of claim 24, wherein the second and third panels are disposed between the first panel and the projector.

30. The multi-layer projection display of claim 29, wherein the first and second panels are positioned such that a line of sight passes from the viewing location through the first and second panels to the projector.

31. The multi-layer projection display of claim 29, wherein the projector is configured to project the image onto the first panel through the second and third panels when the second and third panels are substantially transparent, an image projected onto the second panel being visible at the viewing location when the first and third panels are substantially transparent, and an image projected onto the third panel being visible at the viewing location when the first and second panels are substantially transparent.

32. The multi-layer projection display of claim 29, wherein the panels arc positioned such that a line of sight passes from the viewing location through the first, second, and third panels to the projector.

33. The multi-layer projection display of claim 24, wherein the determined frequency is sufficient to cause the images projected onto the first and second panels to appear to a human user as a single image that includes both of the projected images.

34. The multi-layer projection display of claim 24, wherein the controller is operable to cause the first, second, or third panel to become substantially opaque by applying a first voltage to the respective panel, and further operable to cause the first, second, or third panel to become substantially transparent by applying a second voltage to the respective panel.

35. The multi-layer projection display of claim 24, wherein the projector is configured to project a second image onto the second panel when the second panel is substantially opaque.

36. The multi-layer projection display of claim 24, wherein the projector is configured to project a third image onto the third panel when the third panel is substantially opaque.

37. The multi-layer projection display of claim 24, further comprising a second projector configured to project a second image onto the second panel when the second panel is substantially opaque.

38. The multi-layer projection display of claim 24, further comprising a third projector configured to project a third image onto the third panel when the third panel is substantially opaque.

39. A gaming machine operable to play a game of chance, the gaming machine comprising:
a value input device capable of receiving value;
a player input device operable to place a wager on the game of chance;
a value output device capable of outputting value associated with play of the game of chance;
a multi-layer projection display including:
first and second panels separated by a predetermined distance, wherein at least a portion of the first panel overlaps at least a portion of the second panel, and
the first panel is disposed between a viewing location and the second panel;
a controller configured to cause the first and second panels to alternate between substantially opaque and substantially transparent states at a determined frequency, such that the first panel is substantially opaque when the second panel is substantially transparent, and the second panel is substantially opaque when the first panel is substantially transparent; and
a projector configured to project an image onto the first panel when the first panel is substantially opaque, and further configured to project the image onto the second panel when the second panel is substantially opaque.

40. The gaming machine of claim 39, wherein the image projected onto the first panel is visible at the viewing location when the image is projected onto the first panel, and the image projected onto the second panel is visible at the viewing location when the image is projected onto the second panel.

41. The gaming machine of claim 39, wherein no image is visible on the second panel when the image is projected onto the first panel, and no image is visible on the first panel when the image is projected onto the second panel.

42. A method for displaying a multi-layer projection image comprising:
providing first and second panels separated by a predetermined distance,
wherein at least a portion of the first panel overlaps at least a portion of the second panel, and the first panel is disposed between a viewing location and the second panel;
causing, by a controller, the first and second panels to alternate between substantially opaque and substantially transparent states at a determined frequency, such that the first panel is substantially opaque when the second panel is substantially transparent, and the second panel is substantially opaque when the first panel is substantially transparent;
projecting, by a projector, an image onto the first panel when the first panel is substantially opaque; and projecting, by the projector, the image onto the second panel when the second panel is substantially opaque.

43. The method of claim 42, wherein the image projected onto the first panel is visible at the viewing location when the image is projected onto the first panel, and the image projected onto the second panel is visible at the viewing location when the image is projected onto the second panel.

44. The method of claim 42, wherein no image is visible on the second panel when the image is projected onto the first panel, and no image is visible on the first panel when the image is projected onto the second panel.

45. The method of claim 42, wherein the first panel is positioned such that a line of sight passes from the viewing location through the first panel to the projector.

46. The method of claim 42, wherein the second panel is disposed between the first panel and the projector.

47. The method of claim 46, wherein the first and second panels are positioned such that a line of sight passes from the viewing location through the first and second panels to the projector.

48. The method of claim 42, wherein the projector is configured to project the image onto the first panel through the second panel when the second panel is substantially transparent, and the image projected onto the second panel is visible at the viewing location through the first panel when the first panel is substantially transparent.

49. The method of claim 42, wherein the determined frequency is sufficient to cause the images projected onto the first and second panels to appear to a human user as a single image that includes both of the projected images.

50. The method of claim 42, wherein the determined frequency is at least 60 transitions between the opaque and transparent states per second.

51. The method of claim 42, wherein the controller is operable to cause the first or second panel to become substantially opaque by applying a first voltage to the first or second panel, respectively, and further operable to cause the first or second panel to become substantially transparent by applying a second voltage to the first panel or second panel, respectively.

52. The method of claim 42, wherein the projector is configured to project a second image onto the second panel when the second panel is substantially opaque.

53. The method of claim 42, further comprising projecting, by a second projector, a second image onto the second panel when the second panel is substantially opaque.

* * * * *